(12) United States Patent
Okazaki

(10) Patent No.: US 8,127,659 B2
(45) Date of Patent: Mar. 6, 2012

(54) COMPRESSIBLE FLUID PRESSURE ACTUATOR DRIVING MECHANISM AND CONTROL APPARATUS THEREOF

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 712 days.

(21) Appl. No.: 12/306,995

(22) PCT Filed: Jan. 8, 2008

(86) PCT No.: PCT/JP2008/050057
§ 371 (c)(1),
(2), (4) Date: Dec. 30, 2008

(87) PCT Pub. No.: WO2008/090753
PCT Pub. Date: Jul. 31, 2008

(65) Prior Publication Data
US 2009/0324366 A1    Dec. 31, 2009

(30) Foreign Application Priority Data
Jan. 22, 2007    (JP) ................ 2007-011393

(51) Int. Cl.
*B25J 19/00* (2006.01)
*F15B 15/10* (2006.01)
(52) U.S. Cl. .................................... 91/358 R; 92/92
(58) Field of Classification Search .......... 60/486; 91/358 R; 92/91, 92
See application file for complete search history.

(56) References Cited

U.S. PATENT DOCUMENTS

| | | | | |
|---|---|---|---|---|
| 4,615,260 | A | * | 10/1986 | Takagi et al. ............ 92/92 |
| 4,739,692 | A | * | 4/1988 | Wassam et al. .......... 92/92 |
| 5,351,602 | A | * | 10/1994 | Monroe ................. 60/413 |

FOREIGN PATENT DOCUMENTS

| | | |
|---|---|---|
| JP | 57-189749 | 11/1982 |
| JP | 61-109694 | 7/1986 |
| JP | 2-256299 | 10/1990 |
| JP | 7-27411 | 3/1995 |
| JP | 7-33587 | 6/1995 |
| JP | 2005-083447 | 3/2005 |

OTHER PUBLICATIONS

International Search Report issued Feb. 5, 2008 in the International (PCT) Application of which the present application is the U.S. National Stage.
International Preliminary Report on Patentability issued Sep. 17, 2009 in corresponding International (PCT) Application No. PCT/JP2008/050057.

* cited by examiner

*Primary Examiner* — Thomas E Lazo
(74) *Attorney, Agent, or Firm* — Wenderoth, Lind & Ponack, L.L.P.

(57) ABSTRACT

Fluid pressures of a plurality of compressible fluid pressure actuators that drive a joint through antagonistic driving are controlled by a main-fluid pressure control device, and at the time of applying quick brake upon collision, a proximate fluid pressure high-speed control device, disposed closely to the actuators, carries out pressure application or pressure reduction at a high speed on the actuators so as to be quickly accelerated or decelerated.

15 Claims, 19 Drawing Sheets

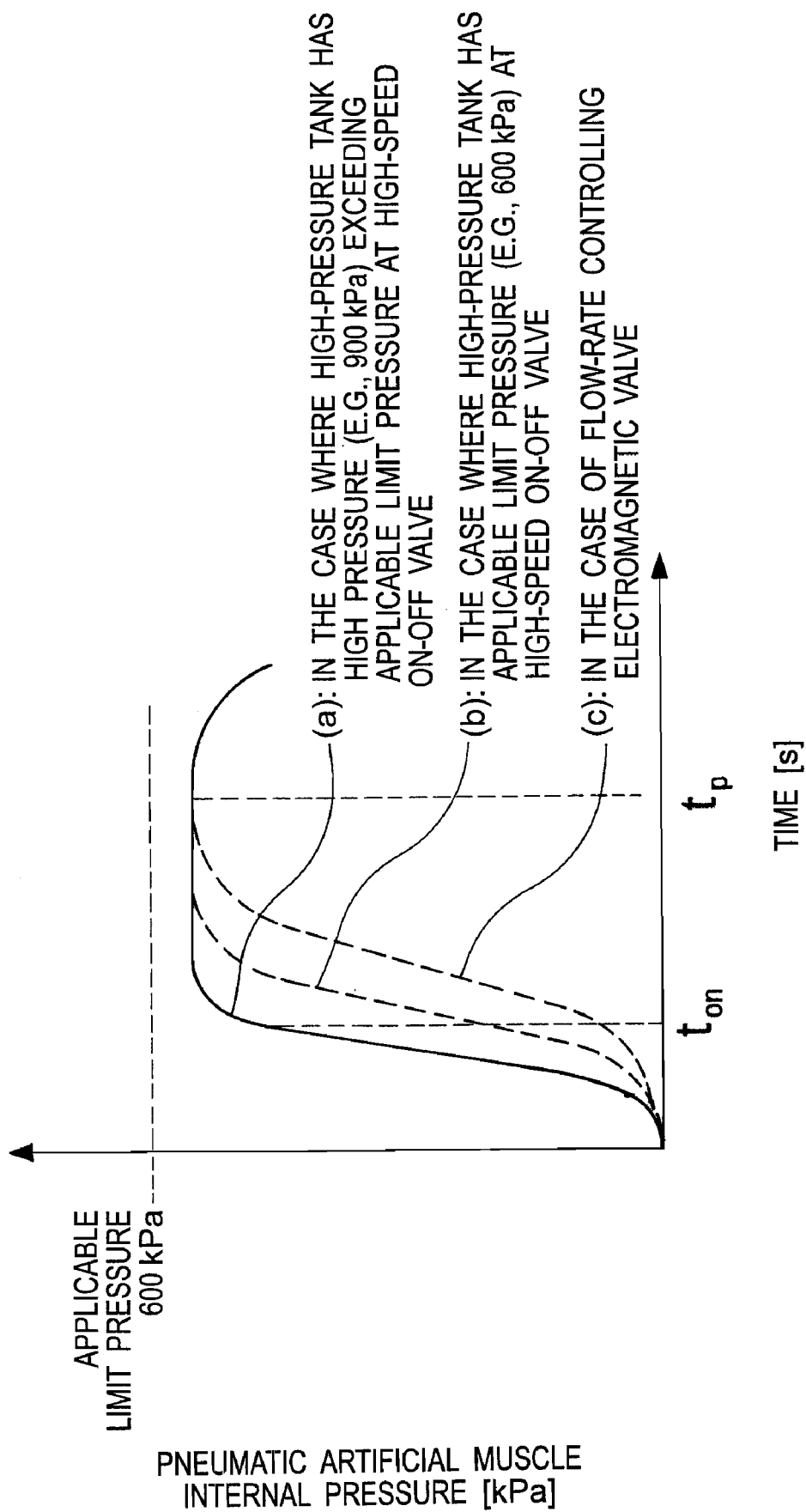

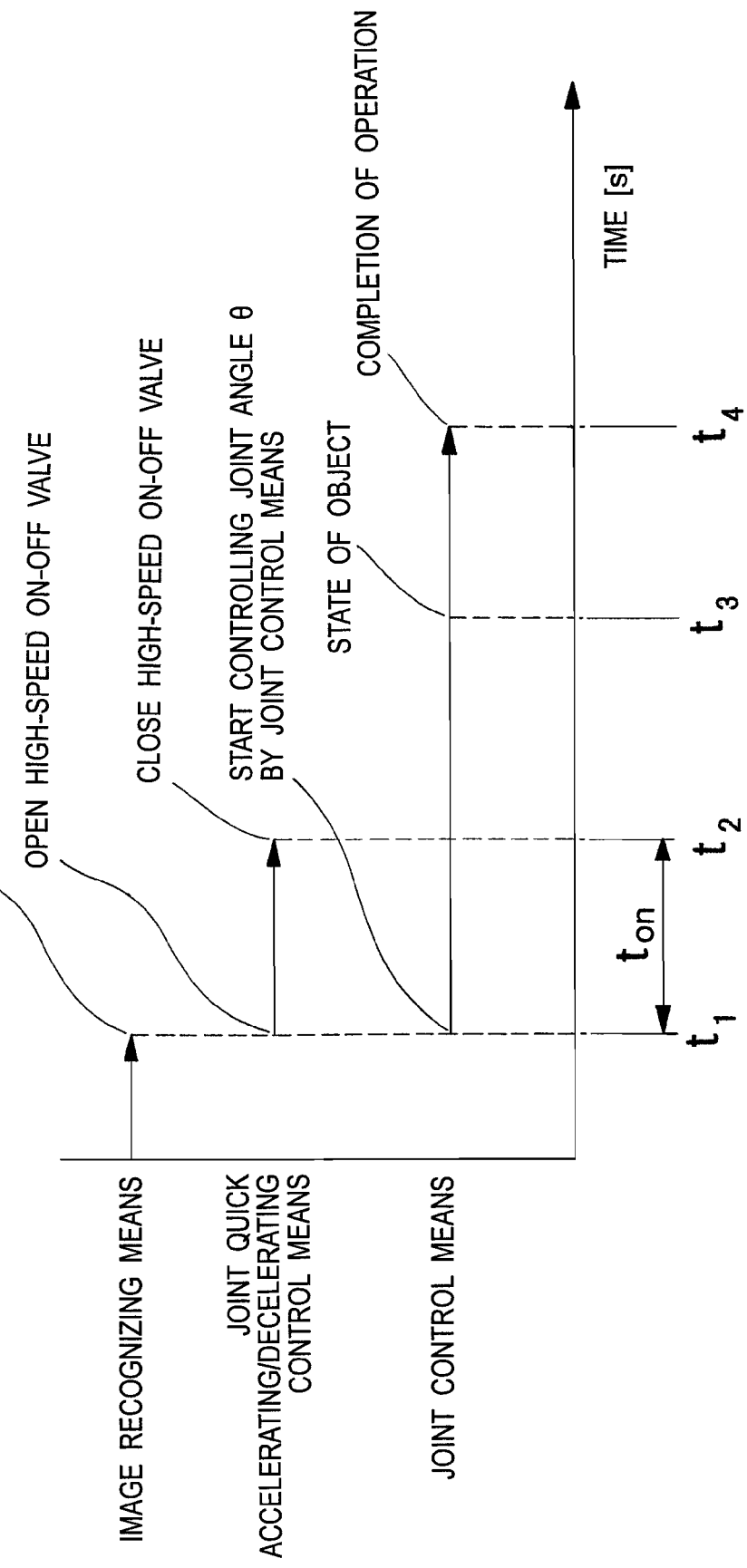

COMPRESSIBLE FLUID PRESSURE ACTUATOR DRIVING MECHANISM AND CONTROL APPARATUS THEREOF

TECHNICAL FIELD

The present invention relates to a compressible fluid pressure actuator driving mechanism and a control apparatus thereof that are applicable to a driving mechanism of a mechanical apparatus, such as a robot arm.

BACKGROUND ART

In recent years, home robots such as robot pets have been vigorously developed, and it is expected that in the future, more practical home robots, such as housekeeping support robots, will be put into practical use. Since home robots are required to enter homes and coexist with people, they need specifications different from those of conventional industrial robots and the like.

In the industrial robots, electric motors and reduction gears are used, and a high-gain feedback control is carried out so that high hand positional precision with a repetition precision of 0.1 mm or the like has been achieved. However, these mechanisms driven by electric motors have high stiffness and tend to lack flexibility, resulting in issues from the viewpoint of safety.

In contrast, the home robots do not necessarily require such high precision with a repetition precision of 0.1 mm or the like, and more emphasis is put on safety to provide characteristics such as being not harmful even upon contact with a human being. Consequently, the mechanisms to be driven by electric motors, such as conventional industrial robots, are not considered to be suitable for the field of home robots and the like on which more emphasis is put on safety, and there has been strong demand for flexible, safe driving mechanisms.

In order to achieve these issues, a driving mechanism to be driven by McKibben type pneumatic actuators has been proposed as a conventional technique. In JP No. 7-27411B (Patent Document 1), a driving apparatus has been proposed in which, by inputting disturbance signals having the same phase to a pneumatic actuator driving circuit, a dithering effect is obtained so that controlling characteristics are improved, and upon detection of an abnormal state in servo components by using a servo valve driving signal or the like, the power source is cut off and brakes of the driving apparatus are operated to prevent an out-of-control state.

Patent Document 1: JP No. 7-27411B

DISCLOSURE OF INVENTION

Subject to be Solved by the Invention

In the structure of the above-mentioned Patent Document 1, however, since air has compressibility, the pneumatic driving system is poor in response characteristic, with the result that it is difficult to make an emergency stop only by shutting down the power source, and there is a possibility that, for example, upon occurrence of a collision, the collided object might be seriously damaged.

Moreover, only the decelerating operation is possible by the braking device, and operations, such as avoiding collision by quickly accelerating the speed and the like, are not possible.

Furthermore, installing a braking device leads to a complicated structure and an increase in weight, with the result that the motion energy of the driving device increases to also cause degradation in safety.

An object of the present invention is to solve the above-mentioned conventional issues with the joint driving mechanism, and to provide a compressible fluid pressure actuator driving mechanism capable of responding more quickly than the fluid pressure control operation of a main-fluid pressure control means for controlling motions of a joint, and a control apparatus thereof.

Means for Solving the Subject

In order to achieve the above object, the present invention has structures as described below.

According to a first aspect of the present invention, there is provided a compressible fluid pressure actuator driving mechanism in which a joint motion is driven by antagonistic driving of a plurality of compressible fluid pressure actuators, the mechanism characterized by including:

a main-fluid pressure control means for controlling the joint motion by carrying out a pressure-applying or pressure-reducing control operation on the compressible fluid pressure actuators to control the respective fluid pressures of the compressible fluid pressure actuators; and a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion to allow the compressible fluid pressure actuators to carry out a quick accelerating operation or a quick decelerating operation.

According to a fourteenth aspect of the present invention, there is provided an apparatus for controlling a compressible fluid pressure actuator driving mechanism with which a joint motion is driven by antagonistic driving of a plurality of compressible fluid pressure actuators, the compressible fluid pressure actuator driving mechanism characterized by comprising: a main-fluid pressure control means for controlling the joint motion by carrying out a pressure-applying or pressure-reducing control operation on the compressible fluid pressure actuators to control respective fluid pressures of the compressible fluid pressure actuators; and a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion to allow the compressible fluid pressure actuators to carry out a quick accelerating operation or a quick decelerating operation, and the control apparatus includes:

a joint control means for controlling the joint motion by controlling operation of the main-fluid pressure control means based upon information of the joint motion; and a joint quick accelerating/decelerating control means for controlling operation of the proximate fluid pressure high-speed control means to control a quick accelerating or decelerating operation of the joint.

Effects of the Invention

In accordance with the present invention, the proximate fluid pressure high-speed control means, disposed closely in the vicinity of the compressible fluid pressure actuators, for carrying out the pressure-applying or pressure-reducing operation on the compressible fluid pressure actuators more quickly than the fluid pressure control operation of the main-fluid pressure control means is provided; thus, since the proximate fluid pressure high-speed control means carries out the pressure-applying or pressure-reducing operation on the compressible fluid pressure actuators more quickly than the fluid pressure control operation of the main-fluid pressure control means for controlling the joint motion, it is possible to carry out a quick accelerating operation or a quick decelerating operation on the joint motion.

Therefore, performance relating to operations requiring high-speed response, such as an emergency collision-avoiding operation including a quick-braking operation upon occurrence of a collision and quick acceleration to avoid a collision in approaching an obstacle, are improved, so that a safe compressible fluid pressure actuator driving mechanism and its control apparatus are achieved.

Moreover, since the joint motion is controlled so as to quickly accelerate or quickly decelerate, it is possible to achieve a compressible fluid pressure actuator driving mechanism capable of capturing a fast-moving, falling object with a structural member, and its control apparatus.

BRIEF DESCRIPTION OF DRAWINGS

These and other aspects and features of the present invention will become clear from the following description taken in conjunction with the preferred embodiments thereof with reference to the accompanying drawings, in which:

FIG. 9 is a view that illustrates an increase in internal pressure of the pneumatic artificial muscle of the compressible fluid pressure actuator driving mechanism in accordance with the first embodiment of the present invention;

FIG. 18 is a timing chart that illustrates operations of the compressible fluid pressure actuator driving mechanism in accordance with the fifth embodiment of the present invention.

BEST MODE FOR CARRYING OUT THE INVENTION

Figure 1:
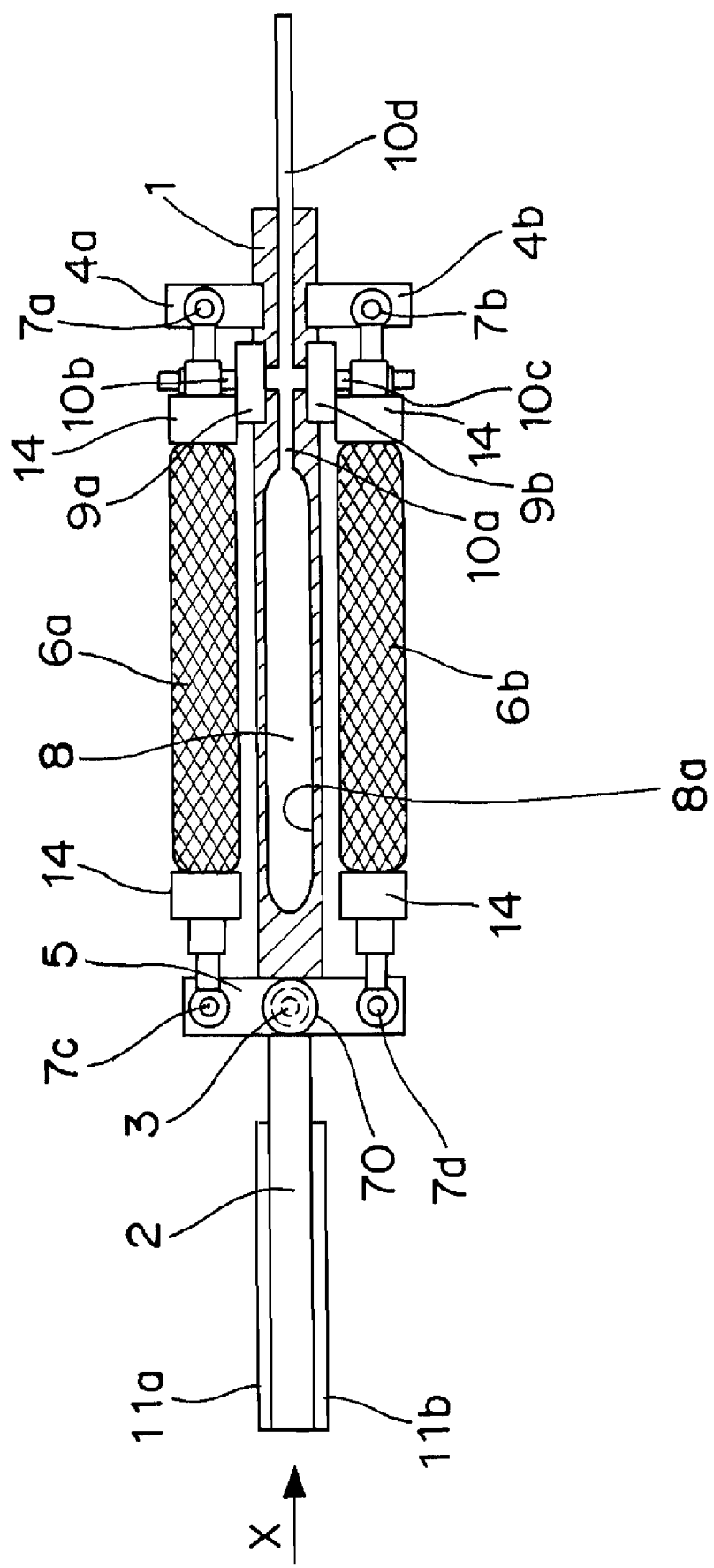
FIG. 1 is a view that shows a structure of a compressible fluid pressure actuator driving mechanism in accordance with a first embodiment of the present invention.

Before the description of the present invention proceeds, it is to be noted that like parts are designated by like reference numerals throughout the accompanying drawings.

According to a first aspect of the present invention, there is provided a compressible fluid pressure actuator driving mechanism with which a joint motion is driven by antagonistic driving of a plurality of compressible fluid pressure actuators, characterized by comprising:

a main-fluid pressure control means for controlling the joint motion by carrying out a pressure-applying or pressure-reducing control operation on the compressible fluid pressure actuators to control respective fluid pressures of the compressible fluid pressure actuators; and a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion such that the compressible fluid pressure actuators are quickly accelerated or quickly decelerated.

According to a second aspect of the present invention, there is provided the compressible fluid pressure actuator driving mechanism as defined in the first aspect, characterized by further comprising:

a fluid supply means for supplying a fluid to each of the compressible fluid pressure actuators to apply a pressure to each of the compressible fluid pressure actuators, wherein the proximate fluid pressure high-speed control means is capable of quickly applying pressure to each of the compressible fluid pressure actuators by using the fluid supplied by the fluid supply means.

According to a third aspect of the present invention, there is provided the compressible fluid pressure actuator driving mechanism as defined in the first aspect, characterized in that the proximate fluid pressure high-speed control means is a bypass means for mutually bypassing the antagonistic compressible fluid pressure actuators, and by opening and closing the bypass means, pressure application or pressure reduction is carried out on each of the compressible fluid pressure actuators more quickly than the fluid pressure control operation of the main-fluid pressure control means for controlling the joint motion.

According to a fourth aspect of the present invention, there is provided the compressible fluid pressure actuator driving mechanism as defined in the first or second aspect, characterized in that the proximate fluid pressure high-speed control means is a relief valve for carrying out the pressure-reducing control operation, when a force applied to the compressible fluid pressure actuator driving mechanism from an outside exceeds a predetermined value.

According to a fifth aspect of the present invention, there is provided the compressible fluid pressure actuator driving mechanism as defined in the first aspect, characterized by further comprising a collision detecting means for detecting a collision, wherein upon detecting a collision by the collision detecting means, the proximate fluid pressure high-speed control means is allowed to carry out the pressure-reducing control operation.

According to a sixth aspect of the present invention, there is provided the compressible fluid pressure actuator driving mechanism as defined in the first aspect, characterized in that the mechanism further comprises a joint quick accelerating/decelerating control means for carrying out pressure-applying and reducing control on the compressible fluid pressure actuators depending on time, by controlling operation of the proximate fluid pressure high-speed control means such that, after an open state is kept by the proximate fluid pressure high-speed control means for a predetermined time, a closed state is attained to close a passage.

According to a seventh aspect of the present invention, there is provided the compressible fluid pressure actuator driving mechanism as defined in the sixth aspect, characterized by further comprising a joint quick accelerating/decelerating control means for controlling operation of the proximate fluid pressure high-speed control means by determining a length of a period of time during which the proximate fluid pressure high-speed control means is kept in an open state, based upon a level of a force to be applied to the compressible fluid pressure actuator driving mechanism from an outside.

According to an eighth aspect of the present invention, there is provided the compressible fluid pressure actuator driving mechanism as defined in the sixth aspect, characterized by further comprising a joint quick accelerating/decelerating control means for controlling operation of the proximate fluid pressure high-speed control means by determining a length of a period of time during which the proximate fluid pressure high-speed control means is kept in an open state, based upon a level of an operation speed of the compressible fluid pressure actuator driving mechanism.

According to a ninth aspect of the present invention, there is provided the compressible fluid pressure actuator driving mechanism as defined in the second aspect, characterized in that the fluid supply means has a fluid storing means for storing the fluid to be supplied to each of the compressible fluid pressure actuators from the fluid supply means, the fluid storing means being disposed closely to the compressible fluid pressure actuators.

According to a tenth aspect of the present invention, there is provided the compressible fluid pressure actuator driving mechanism as defined in the ninth aspect, characterized in that a void is provided in a structural member of the compressible fluid pressure actuator driving mechanism such that the fluid storing means stores the fluid in the void.

According to an eleventh aspect of the present invention, there is provided the compressible fluid pressure actuator driving mechanism as defined in the second aspect, characterized in that the fluid supply means supplies a fluid having pressure exceeding an applicable limit pressure of the compressible fluid pressure actuators.

According to a twelfth aspect of the present invention, there is provided the compressible fluid pressure actuator driving mechanism as defined in the first aspect, characterized in that the proximate fluid pressure high-speed control means is a high-speed ON-OFF valve that communicates with the compressible fluid pressure actuators to carry out only opening and closing operations on a passage to execute a pressure-applying or pressure-reducing control operation on the compressible fluid pressure actuators, for carrying out the opening and closing operations more quickly than the fluid pressure control operation of the main-fluid pressure control means.

According to a thirteenth aspect of the present invention, there is provided the compressible fluid pressure actuator driving mechanism as defined in the first aspect, characterized by further comprising: a biological information detecting means for detecting biological information; and a biological information recognizing means for recognizing the biological information detected by the biological information detecting means, wherein when information recognized by the biological information recognizing means corresponds to an operation command, the compressible fluid pressure actuator driving mechanism operates the proximate fluid pressure high-speed control means.

According to a fourteenth aspect of the present invention, there is provided an apparatus for controlling a compressible fluid pressure actuator driving mechanism, characterized in that the apparatus comprises: a main-fluid pressure control means for controlling the joint motion by carrying out a pressure-applying or pressure-reducing control operation on the compressible fluid pressure actuators to control respective fluid pressures of the compressible fluid pressure actuators; and a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion such that the compressible fluid pressure actuators are quickly accelerated or quickly decelerated, the apparatus comprising:

a joint control means for controlling the joint motion by controlling operation of the main-fluid pressure control means based upon information of the joint motion; and a joint quick accelerating/decelerating control means for controlling operation of the proximate fluid pressure high-speed control means such that a quick accelerating or decelerating operation of the joint is controlled.

Referring to the drawings, a description is given on embodiments of the present invention.

FIRST EMBODIMENT

FIG. 1 is an overall view that shows a structure of a compressible fluid pressure actuator driving mechanism in accordance with a first embodiment of the present invention. In FIG. 1, reference numeral 1 represents a first structural member, and reference numeral 2 represents a second structural member. The first structural member 1 and the second structural member 2 are coupled to each other by a rotary joint 3 so as to be rotatable relative to each other. An angle sensor 70, such as an encoder, is disposed in the rotary joint 3, so that a joint angle θ made by the center axis of the first structural member 1 and the center axis of the second structural member 2 shown in FIG. 6 can be measured.

In the first structural member 1, actuator supporting members 4a and 4b opposing each other are disposed in a direction orthogonal to the longitudinal direction of the first structural member 1, and in the second structural member 2, an actuator driving-force transmission member 5 is disposed in a direction orthogonal to the longitudinal direction of the second structural member 2.

Reference numerals 6a and 6b denote pneumatic artificial muscles each of which serves as one example of a compressible fluid pressure actuator, and these are disposed substantially in parallel with the first structural member 1, with the first structural member 1 being interposed therebetween. One of the ends of each of the pneumatic artificial muscles 6a and 6b is connected to each of the actuator supporting members 4a and 4b through each of rotary joint devices 7a and 7b so as to be rotatable. Moreover, the other end of each of the pneumatic artificial muscles 6a and 6b is connected to the actuator driving-force transmission member 5 through each of rotary joint devices 7c and 7d so as to be rotatable.

Reference numeral 8 denotes a high pressure tank that serves as one example of a high-pressure fluid storing means, which is disposed inside the first structural member 1, stores a high-pressure fluid in a void 8a provided in the first structural member 1, and is connected to the pneumatic artificial muscles 6a and 6b and an air-pressure supply driving system, which will be described later, through pneumatic pipes 10a, 10b, 10c, and 10d. That is, one end of the pneumatic pipe 10a is connected to one end of the high-pressure tank 8, and the other end of the pneumatic pipe 10a is connected to the pneumatic pipes 10b and 10c that are branched toward the pneumatic artificial muscles 6a and 6b respectively, with the pneumatic pipes 10b and 10c being connected to the pneumatic artificial muscles 6a and 6b respectively. Moreover, one end of the pneumatic pipe 10d is also connected to the other end of the pneumatic pipe 10a, and the other end of the pneumatic pipe 10d is extended in the longitudinal direction of the first structural member 1 so as to be connected to the air-pressure supply driving system, which will be described later. Meanwhile, reference numerals 9a and 9b denote high-speed ON-OFF valves each of which serve as one example of a proximate fluid pressure high-speed control means, and operations of the high-speed ON-OFF valves 9a and 9b are controlled by a controlling computer 24, which will be described later. Moreover, the high-speed ON-OFF valves 9a and 9b are installed respectively in pneumatic pipes 10b and 10c that are connected to the pneumatic artificial muscles 6a and 6b respectively from the high-pressure tank 8, and control opening/closing operations of passages of the pneumatic pipes 10b and 10c respectively.

Figure 2:
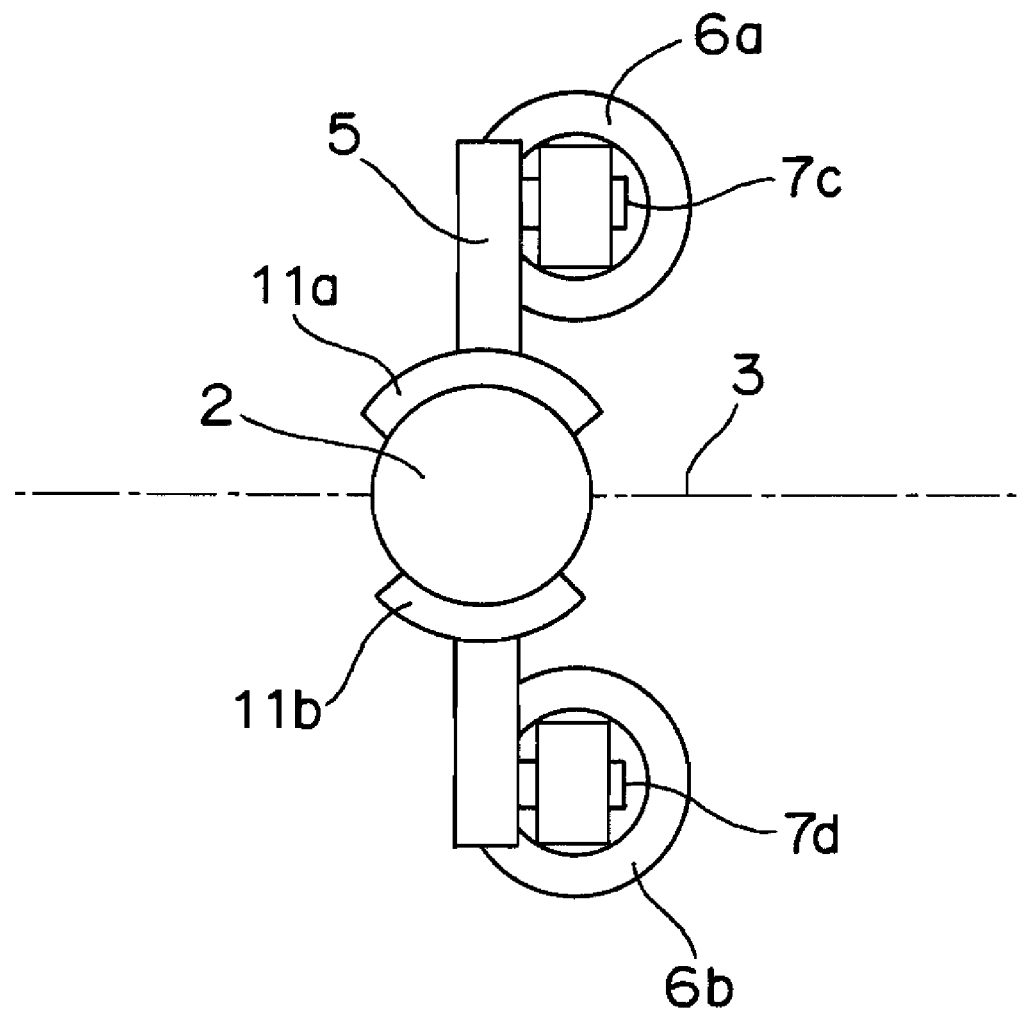
FIG. 2 is a view that shows a structure of the compressible fluid pressure actuator driving mechanism of the first embodiment of the present invention, when viewed in a different direction.

Reference numerals 11a and 11b denote collision detecting sensors each of which serves as one example of a collision detecting means for detecting the fact that a colliding object, such as a person or an object, has collided with the second structural member 2, and the collision detecting sensors 11a and 11b are configured by, for example, pressure sensitive sensors and disposed on the surface of the second structural member 2. Upon detection of a collision by the collision detecting sensors 11a and 11b, the high-speed ON-OFF valves 9a and 9b are subjected to pressure-reducing control operation, as will be described later. FIG. 2 is a view that shows the structural member 2 viewed in the longitudinal direction of the second structural member 2 from the direction of an arrow X in FIG. 1. The positions at which the collision detecting sensors 11a and 11b are disposed herein are symmetrical with each other relative to the second structural member 2, so that the collision detecting sensor 11a is disposed along a direction of a rotation movement (clockwise in FIG. 1) that is generated around the rotary joint 3 when the pneumatic artificial muscle 6a contracts, while the collision detecting sensor 11b is disposed along a direction of a rotation movement (counterclockwise in FIG. 1) that is generated around the rotary joint 3 when the pneumatic artificial muscle 6b contracts.

Figure 3A:
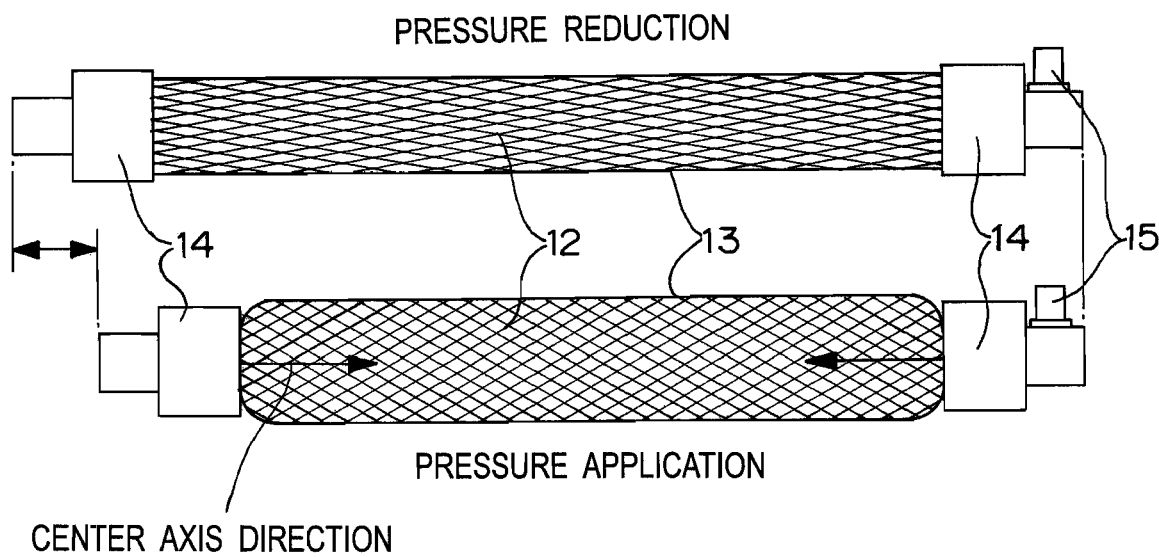
FIG. 3A is a view that shows a structure and operations of a pneumatic artificial muscle.
Figure 3B:
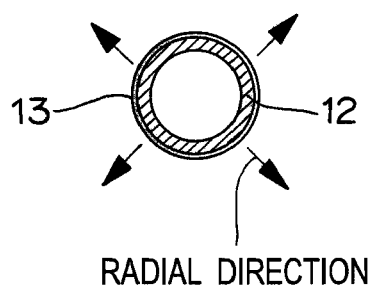
FIG. 3B is a cross-sectional view that shows the structure and operations of the pneumatic artificial muscle.

FIGS. 3A and 3B are views that show a structure of a pneumatic artificial muscle each of which serves as one example of the pneumatic artificial muscles 6a and 6b. As shown in FIGS. 3A and 3B, each of the pneumatic artificial muscles 6a and 6b has a structure in which a restraining member 13 made from fiber cords is disposed on the outer surface of a tube-shaped elastic member 12 made of a rubber material, with the two ends of the tube-shaped elastic member 12 being air-tightly sealed with sealing members 14 respectively. When an internal pressure is applied to the inner space of the tube-shaped elastic member 12 by supplying a compressible fluid such as air to the inside of the tube-shaped elastic member 12 through fluid injecting/discharging members 15, the tube-shaped elastic member 12 tries to expand mainly in its radial direction; however, by the restraining function of the restraining member 13, the movement is converted to movement in the center-axis direction of the tube-shaped elastic member 12, and the entire length contracts. Since these pneumatic artificial muscles are mainly made of an elastic member, they are flexible and serve as safe and lightweight actuators.

Figure 4:
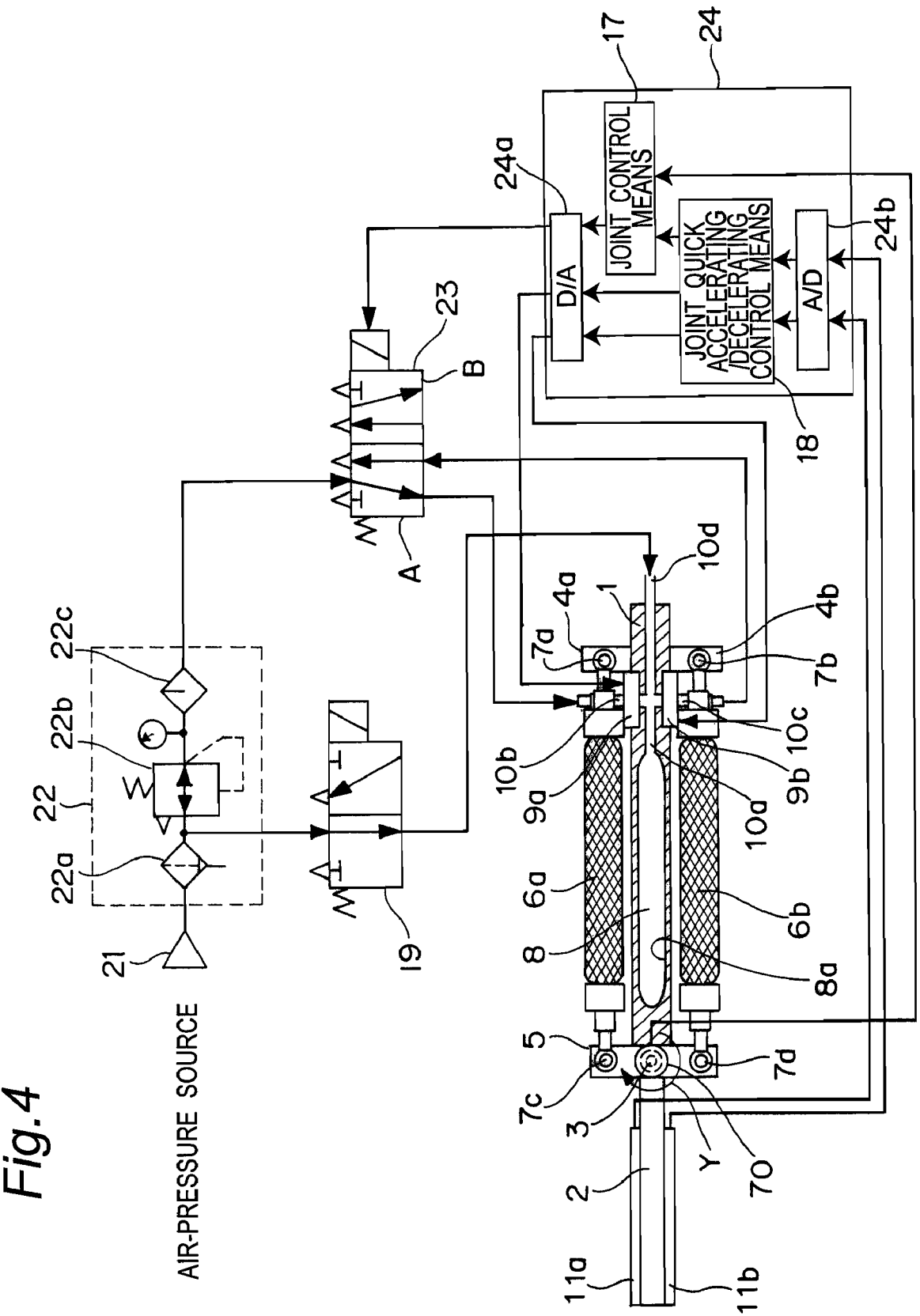
FIG. 4 is a view that shows structures of the compressible fluid pressure actuator driving mechanism in accordance with the first embodiment of the present invention and an air-pressure supply driving system for driving the compressible fluid pressure actuator driving mechanism.

FIG. 4 is a view that shows structures of the pneumatic artificial muscles 6a and 6b and the air-pressure supply driving system for driving the pneumatic artificial muscles 6a and 6b. In FIG. 4, reference numeral 21 represents an air-pressure source, such as a compressor, and reference numeral 22 represents an air-pressure adjusting unit. The air-pressure adjusting unit 22 is configured by a set of a pneumatic filter 22a of the air-pressure source 21, an air-pressure decreasing valve 22b, and a pneumatic lubricator 22c. These air-pressure source 21, air-pressure adjusting unit 22, and high-pressure tank 8 constitute one example of a high-pressure fluid supply means for supplying a fluid to each of the pneumatic artificial muscles 6a and 6b so as to apply pressure to the pneumatic artificial muscles 6a and 6b.

Reference numeral 23 represents one example of a main-fluid pressure control means, that is, a flow-rate controlling electromagnetic valve with five ports that drives a spool to advance and retreat by using force of an electromagnet so as to control the flow rate, and the advancing and retreating driven-movements thereof are controlled by the controlling computer 24, which will be described later.

Figure 5A:
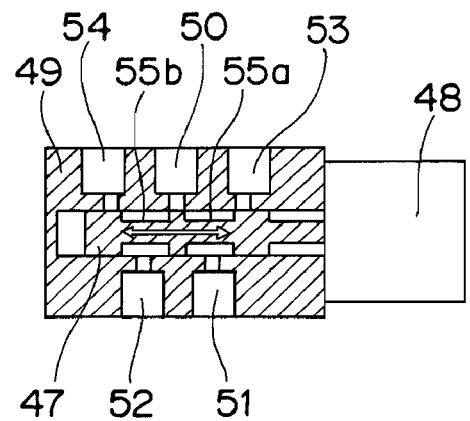
FIG. 5A is a view that shows a structure and operations of a flow-rate controlling electromagnetic valve.
Figure 5B:
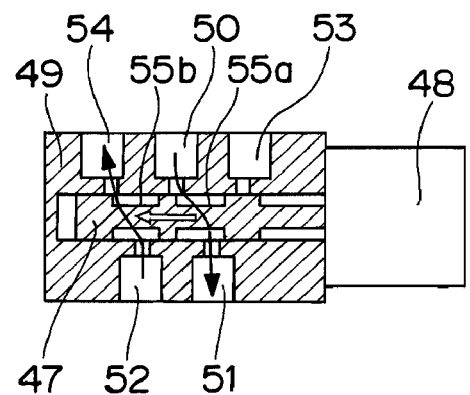
FIG. 5B is a view that shows the structure and operations of the flow-rate controlling electromagnetic valve.
Figure 5C:
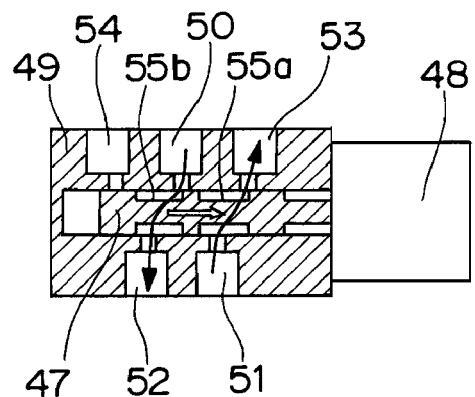
FIG. 5C is a view that shows the structure and operations of the flow-rate controlling electromagnetic valve.

FIGS. 5A to 5C show a structure of the flow-rate controlling electromagnetic valve 23. Reference numeral 47 represents the spool having a columnar shape, with grooves 55a and 55b being formed on its outer circumferential face, and the spool 47 is driven to advance and retreat along the longitudinal direction of the spool 47 by a linear servo actuator 48 that is operated by an electromagnet; thus, the spool 47 is moved rightward as well as leftward (along the longitudinal direction of the spool 47) on the paper surfaces of FIGS. 5A to 5C. Moreover, a box member 49, which houses the spool 47, is provided with an air suction port 50 communicating with the air-pressure-source-21-side, a first supply port 51 communicating with the pneumatic pipe 10c, a second supply port 52 communicating with the pneumatic pipe 10b, a first exhaust port 53 communicating with the atmospheric-pressure side, and a second exhaust port 54 communicating with the atmospheric-pressure side respectively.

The grooves 55a and 55b are formed on the spool 47 in such a manner that, when the spool 47 is moved toward the left side of the paper surface of FIG. 5A or FIG. 5B by the linear servo actuator 48 that is controlled and driven by the controlling computer 24 from the state shown in FIG. 5A to the state shown in FIG. 5B, a passage from the suction port 50 to the first supply port 51 is opened by the groove 55a, and a passage from the second supply port 52 to the second exhaust port 54 is opened by the groove 55b.

In contrast, when the spool 47 is moved toward the right side of the paper surface of FIG. 5A or FIG. 5B by the linear servo actuator 48 that is controlled and driven by the controlling computer 24 from the state shown in FIG. 5A or the state shown in FIG. 5B to the state shown in FIG. 5C, a passage from the suction port 50 to the second supply port 52 is opened by the groove 55b, and a passage from the first supply port 51 to the first exhaust port 53 is opened by the groove 55a.

In addition, the flow rates of each of the opened passages as described above become greater in proportion to the amount of movement of the spool 47.

As described above, the flow-rate controlling electromagnetic valve 23 accurately servo-controls the position of the spool valve (spool) 47 in accordance with a voltage command value inputted from the controlling computer 24 to the flow-rate controlling electromagnetic valve 23, so that the flow rates of air flowing through the respective ports of the flow-rate controlling electromagnetic valve 23 can be finely controlled continuously. As a result, by carrying out a pressure-applying or pressure-reducing control operation on each of the pneumatic artificial muscles 6a and 6b, the fluid pressure of each of the pneumatic artificial muscles 6a and 6b is controlled so that the motions of the joint 3 can be controlled.

Returning to FIG. 4, reference numeral 24 denotes the controlling computer that is implemented, for example, by a general personal computer and serves to function as an example of a control apparatus. On the controlling computer 24, a joint control means 17 and a joint quick accelerating/decelerating control means 18 are installed as programs that operate independently.

Figure 6:
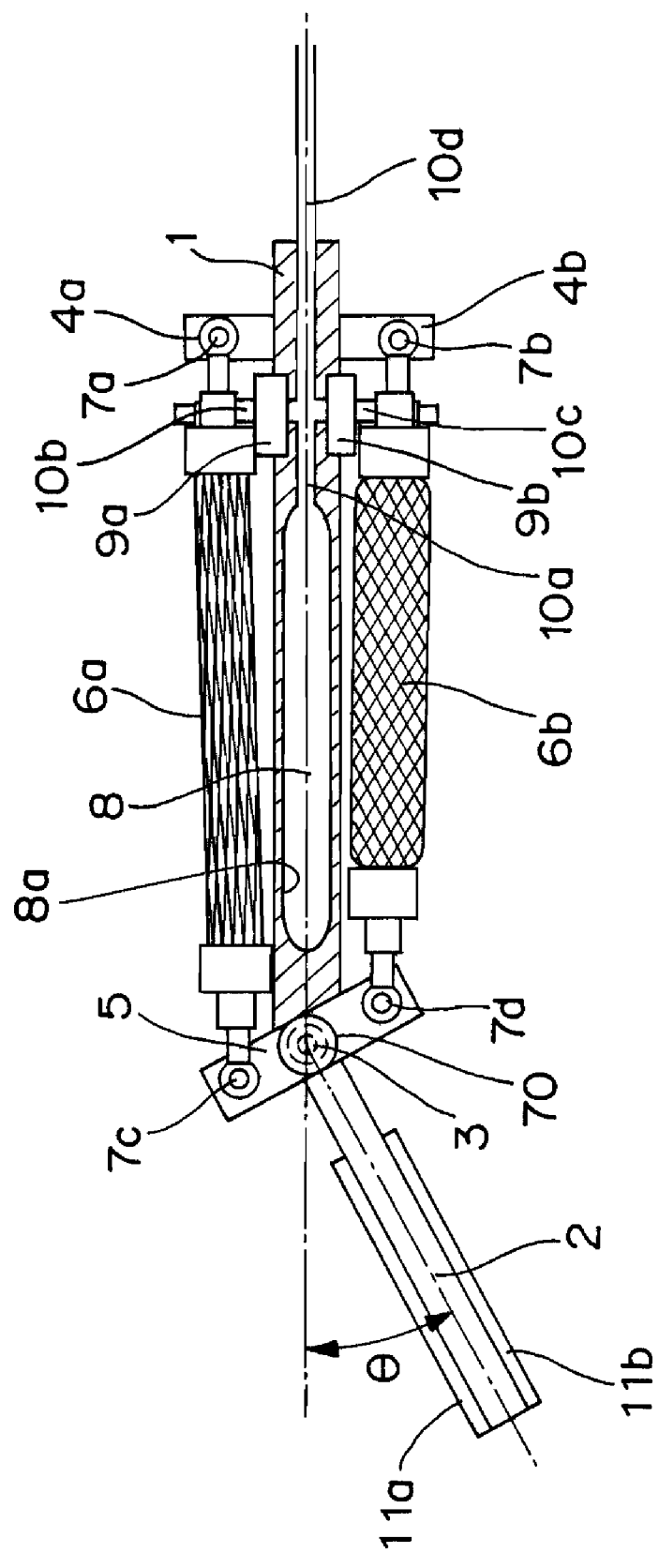
FIG. 6 is a view that shows operations of the compressible fluid pressure actuator driving mechanism in accordance with the first embodiment of the present invention.

Based upon information relating to a motion of the joint 3, for example, information from the angle sensor 70, the joint control means 17 controls oscillating motions of the first structural member 1 and the second structural member 2, that is, the joint angle indicated by θ in FIG. 6. A D/A board 24a is mounted on the controlling computer 24, and the joint control means 17 outputs a voltage command value to the flow-rate controlling electromagnetic valve 23 through the D/A board 24a so that the respective flow rates of air flowing through the fluid injecting/discharging members 15 are finely controlled continuously, thereby controlling the joint angle θ.

The joint quick accelerating/decelerating control means 18 controls the oscillating motions of the first structural member 1 and the second structural member 2, that is, the braking operation relating to the motion in the joint angle θ. An A/D board 24b is mounted on the controlling computer 24 so that a signal from a collision detecting sensor 11a or 11b is inputted to the joint quick accelerating/decelerating control means 18 through the A/D board 24b. Moreover, the D/A board 24a is also connected to the high-speed ON-OFF valves 9a and 9b, and the joint quick accelerating/decelerating control means 18 outputs voltage command values respectively to the high-speed ON-OFF valves 9a and 9b through the D/A board 24a, so that the open/close states of the high-speed ON-OFF valves 9a and 9b are controlled respectively, thereby controlling braking operations to the motion in the joint angle θ.

Figure 7A:
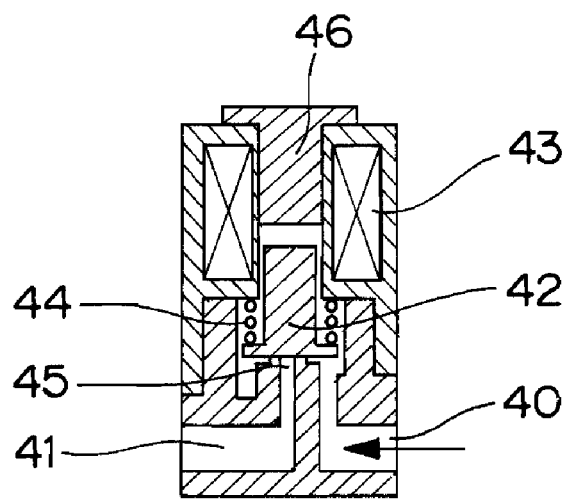
FIG. 7A is a view that shows a structure and operations of a high-speed ON-OFF valve.
Figure 7B:
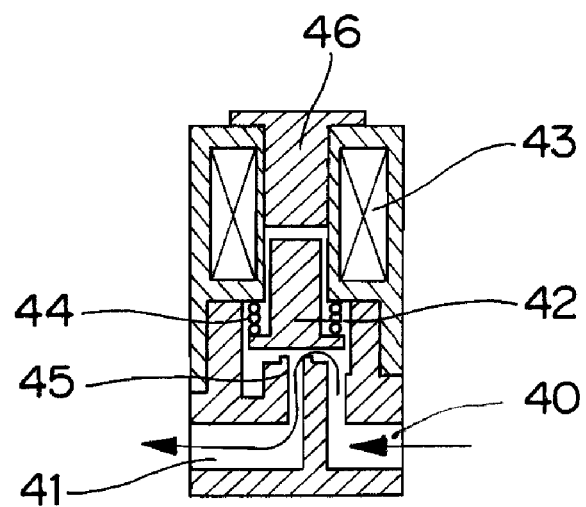
FIG. 7B is a view that shows the structure and operations of the high-speed ON-OFF valve.

FIGS. 7A and 7B show the structures and operations of the high-speed ON-OFF valves 9a and 9b. Each of the high-speed ON-OFF valves 9a and 9b has a structure with two ports of an introducing port 40 and a discharging port 41, and the opened and non-opened states between the two ports 40 and 41 are controlled by vertical movements of a plunger 42 shown in FIGS. 7A and 7B.

In the case where no power is applied to the electromagnet 43, since the plunger 42 is pressed onto an orifice 45 by pressing force of a spring 44, the passage from the introducing port 40 to the discharging port 41 is closed.

Meanwhile, upon application of power to the electromagnet 43, a core 46 is magnetized so that the plunger 42 is attracted to the core 46 by magnetic force against the pressing force of the spring 44, thereby raising the plunger 42. Therefore, the plunger 42 departs from the orifice 45, so that the passage from the introducing port 40 to the discharging port 41 is opened.

Figure 8:
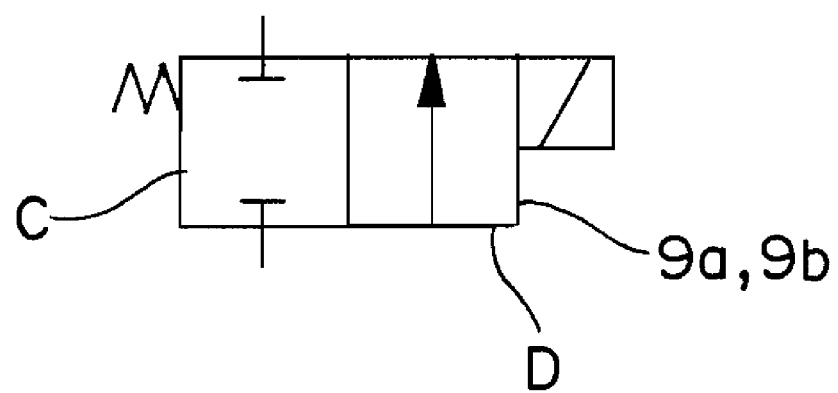
FIG. 8 is a view that shows pneumatic circuit symbols that indicate the operations of the high-speed ON-OFF valve.

Each of the high-speed ON-OFF valves 9a and 9b may be designed to have two ports so as to have only two states of C (close) and D (open) of the pneumatic circuit symbols shown in FIG. 8, unlike the flow-rate controlling electromagnetic valve 23. The plunger 42 is driven by force of the electromagnet 43 so that only the opening and closing operations of the passages are controlled. In comparison with the flow-rate controlling electromagnetic valve 23, this structure is characteristic in that, since the inertia of the plunger 42 serving as a movable unit is small and since only the two operation states are required, the opening and closing operations can be switched at high speeds. Moreover, this structure is also characteristic in that, since no servo control system is required with a fewer numbers of ports, a small-size, lightweight structure is achieved so that it is easily mounted on a movable portion or the like of the mechanism. In this specification, since the speed of switching operations of the ON-OFF valves 9a and 9b is faster than that of the flow-rate controlling electromagnetic valve 23, "high-speed" is added to the "ON-OFF valves 9a and 9b", and these valves are referred to as "high-speed ON-OFF valves 9a and 9b.

In the air-pressure supply driving system shown in FIG. 4, high-pressure air generated by the air-pressure source 21 is pressure-reduced by the air-pressure adjusting unit 22 to be adjusted to constant pressure (for example, to 600 kPa) that is applicable limit pressure to the pneumatic artificial muscles 6a and 6b, and supplied to the five port flow-rate controlling electromagnetic valve 23. The degree of opening of the five port flow-rate controlling electromagnetic valve 23 is controlled in proportion to a voltage command value outputted from the controlling computer 24 through the D/A board 24a.

As described earlier, to the five port flow-rate controlling electromagnetic valve 23, the fluid injecting/discharging members 15 of the respective tube-shaped elastic members 12 of the paired pneumatic artificial muscles 6a and 6b are connected. The paired pneumatic artificial muscles 6a and 6b are disposed substantially in parallel with the first structural member 1 in the longitudinal direction, so that the ends on the fluid injecting/discharging members-15-side of the tube-shaped elastic members 12 are respectively secured to the actuator supporting members 4a and 4b secured to the end of the first structural member 1. The actuator driving-force transmission member 5 supported on the first structural member 1 by the rotary joint 3 so as to freely rotate thereon is supported on each of the other ends of the tube-shaped elastic members 12 of the paired pneumatic artificial muscles 6a and 6b, and on the actuator driving-force transmission member 5, each of the other ends of the tube-shaped elastic members 12 of the paired pneumatic artificial muscles 6a and 6b is supported so as to freely rotate thereon. Therefore, as will be described later, when the respective tube-shaped elastic members 12 of the paired pneumatic artificial muscles 6a and 6b expand and contract, the actuator driving-force transmission member 5 is driven to forwardly/reversely rotate around the rotary joint 3, and the second structural member 2 is driven to forwardly/reversely rotate around the rotary joint 3. Note that rightward rotation indicated by an arrow in FIG. 4 is defined as a forward direction, and leftward rotation reversed to the arrow is defined as a reverse direction.

In the case where a positive voltage command value is inputted to the five port flow-rate controlling electromagnetic valve 23 from the controlling computer 24 through the D/A board 24a, a state indicated by "A" of the pneumatic circuit symbols shown in FIG. 4 is attained, so that a passage from the air-pressure source-21-side toward the fluid injecting/discharging member-15-side of the tube-shaped elastic member 12 of the pneumatic artificial muscle 6a is opened through the five port flow-rate controlling electromagnetic valve 23, thereby supplying air having a flow rate in proportion to the absolute value of the voltage command value to the pneumatic artificial muscle-6a-side. In addition, on the pneumatic artificial muscle-6b-side, a passage from the fluid injecting/discharging member 15 of the tube-shaped elastic member 12 to the atmospheric pressure side is opened through the five port flow-rate controlling electromagnetic valve 23, thereby discharging an air flow having a flow rate in proportion to the absolute value of the voltage command value from the pneumatic artificial muscle-6b-side into the atmosphere. Therefore, as shown in FIG. 4, the total length of the pneumatic artificial muscle 6a contracts, and the total length of the pneumatic artificial muscle 6b extends, so that the rotary joint 3 executes a rightward rotating motion as indicated by an arrow Y in FIG. 4, at a speed in proportion to the absolute value of the voltage command value.

Meanwhile, in the case where a negative voltage command value is inputted to the five port flow-rate controlling electromagnetic valve 23 from the controlling computer 24 through the D/A board 24a, the five port flow-rate controlling electromagnetic valve 23 is switched to bring a state indicated by "B" from the state indicated by "A" of the pneumatic circuit symbols, so that the operation of the pneumatic artificial muscle 6a is reversed, and the rotary joint 3 executes a leftward rotating motion. That is, a passage from the air-pressure source-21-side toward the fluid injecting/discharging member-15-side of the tube-shaped elastic member 12 of the pneumatic artificial muscle 6b is opened through the five port flow-rate controlling electromagnetic valve 23, thereby supplying air having a flow rate in proportion to the absolute value of the voltage command value to the pneumatic artificial muscle-6b-side. In addition, on the pneumatic artificial muscle-6a-side, a passage from the fluid injecting/discharging member 15 of the tube-shaped elastic member 12 to the atmospheric pressure side is opened through the five port flow-rate controlling electromagnetic valve 23, thereby discharging an air flow having a flow rate in proportion to the absolute value of the voltage command value from the pneumatic artificial muscle-6a-side into the atmosphere. Therefore, the total length of the pneumatic artificial muscle 6b contracts, and the total length of the pneumatic artificial muscle 6a extends, so that the joint axial rotation joint 3 executes a leftward rotating motion at a speed in proportion to the absolute value of the voltage command value, in a direction reversed to the arrow Y in FIG. 4.

The following description is given on an air-pressure supply system to the high-pressure tank 8. Reference numeral 19 denotes a pressure control valve that controls the pressure, and the pressure of the succeeding passage from the pressure control valve 19 is controlled to a predetermined pressure (for example, 900 kPa) by the pressure control valve 19. In the case where the air-pressure source 21 is provided as a compressor, since the pressure fluctuates, the pressure control valve 19 is closed when the pressure of the air-pressure source 21 is below the predetermined pressure (for example, 900 kPa) so that the pressure of the succeeding passage from the pressure control valve 19 should not become lower than the predetermined pressure (for example, 900 kPa). In this manner, high-pressure air having predetermined pressure (for example, 900 kPa) prior to being pressure-reduced by the air-pressure decreasing valve 22b of the air-pressure adjusting unit 22 is supplied to the high-pressure tank 8 through the pneumatic pipes 10d and 10a, and stored therein.

The high-pressure air stored in the high-pressure tank 8 is supplied to the pneumatic artificial muscles 6a and 6b respectively through the pneumatic pipes 10b and 10c, and since the high-speed ON-OFF valves 9a and 9b are attached to the pneumatic pipes 10b and 10c, the supply of the high-pressure air is controlled by the high-speed ON-OFF valves 9a and 9b.

Binary voltage command values of, for example, 0 V and 5 V are inputted to the high-speed ON-OFF valves 9a and 9b respectively through the D/A board 24a. When the voltage command value of 0 V is inputted to the high-speed ON-OFF valves 9a and 9b, the high-speed ON-OFF valves 9a and 9b are brought into closed states, with the result that the passages from the high-pressure tank 8 to the pneumatic artificial muscles 6a and 6b are not opened but blocked.

Meanwhile, when the voltage command value of 5 V is inputted to the high-speed ON-OFF valves 9a and 9b, the high-speed ON-OFF valves 9a and 9b are brought into opened states, with the result that the passages from the high-pressure tank 8 to the pneumatic artificial muscles 6a and 6b are opened, thereby supplying high-pressure air stored in the high-pressure tank 8 to the pneumatic artificial muscles 6a and 6b. Therefore, for example, in the case where the voltage command value of 5 V is inputted to the high-speed ON-OFF valve 9a so that the high-speed ON-OFF valve 9a is opened, the pneumatic artificial muscle 6a is pressurized by the high-pressure air from the high-pressure tank 8; on the other hand, in the case where the voltage command value of 5 V is inputted to the high-speed ON-OFF valve 9b so that the high-speed ON-OFF valve 9b is opened, the pneumatic artificial muscle 6b is pressurized by the high-pressure air from the high-pressure tank 8.

The following description is given on operations of the joint driving mechanism having the above structure.

As described above, the artificial muscles are connected to the actuator driving-force transmission member 5 by the rotary joint devices 7a and 7b so as to face with each other, with the first structural member 1 interposed therebetween. Therefore, by antagonistic driving between the pneumatic artificial muscles 6a on the upper side of FIG. 1 and the other pneumatic artificial muscle 6b on the lower side thereof, the motion of the joint 3 is driven. For example, when the pneumatic artificial muscle 6a on the upper side of FIG. 1 contracts, while the other pneumatic artificial muscle 6b on the lower side of FIG. 1 extends, a clockwise rotating motion is generated around the rotation axis of the rotary joint 3. In contrast, when the pneumatic artificial muscle 6a on the upper side of FIG. 1 extends, while the other pneumatic artificial muscle 6b on the lower side of FIG. 1 contracts, the rotating motion is reversed, that is, a counterclockwise rotating motion is generated.

As described above, the first structural member 1 and the actuator driving-force transmission member 5 are driven to execute a forward rotating motion or a reverse rotating motion by the pneumatic artificial muscles 6a and 6b, so that an oscillating motion of the first structural member 1 and the second structural member 2, that is, a motion having an angle 8, is executed.

Normally, the control of the oscillating motion of the first structural member 1 and the second structural member 2, that is, the motion having an angle θ, is carried out by operating the flow-rate controlling electromagnetic valve 23 by the use of a voltage command value. For example, the voltage command value V is given to the flow-rate controlling electromagnetic valve 23 as V=Kθ(θd−θ), a servo control having a joint angle θ is possible. Note that Kθ is a constant gain, and θd is a target value of the joint angle θ.

The flow-rate controlling electromagnetic valve 23 servo-controls a fine position of the spool 47, so that high performance for fine adjustment on the air flow-rate distribution to the pneumatic artificial muscles 6a and 6b is obtained, and fine control operations can be carried out on the motion having an angle θ.

However, with respect to a high-speed response from the open state to the closed state or from the closed state to the open state with no intermediate state accompanied, the electromagnetic valve is inferior to the high-speed ON-OFF valves 9a and 9b because of the high inertia of the spool 47 and the like. Moreover, since the electromagnetic actuator (linear servo actuator 48) for driving the spool 47 needs to have a certain degree of size and complexity, that is, since a certain degree of structural size is required in order to control the fine position of the spool 47, it becomes difficult to mount the electromagnetic valve on a movable portion, such as an arm portion of a robot arm, and the electromagnetic valve needs to be mounted on the base portion or the like. For this reason, the installation positions between the flow-rate controlling electromagnetic valve 23 and the pneumatic artificial muscles 6a and 6b are apart from each other, and long pipes are required from the flow-rate controlling electromagnetic valve 23 to the pneumatic artificial muscles 6a, 6b, with the result that a long period of time is required to transmit air pressure, causing degradation of high response characteristic.

As described above, in the case of the air-pressure control system using the flow-rate controlling electromagnetic valve 23, although an accurate control operation for joint angles or the like is achieved, it is inferior in instantaneous high response characteristic; therefore, when a colliding object such as a person or an object is coming into collision with the second structural member 2 and the joint 3 has to be braked quickly, it may fail to provide a sufficient braking effect and might give serious damage on the colliding object.

In order to solve this issue, the first embodiment of the present invention has a feature that the high-pressure tank 8 and high-speed ON-OFF valves 9a and 9b are disposed so that high-speed pressure application (quick pressure-applying) can be carried out on each of the pneumatic artificial muscles 6a and 6b by the use of the high-speed ON-OFF valves 9a and 9b.

As one example, in the case where the collision detecting sensor 11a detects a collision to the second structural member 2 while a clockwise rotating motion is generated around the rotation axis of the rotary joint 3 with the pneumatic artificial muscle 6a on the upper side in FIG. 1 contracting and the other pneumatic artificial muscle 6b on the lower side in FIG. 1 extending, the collision detecting sensor 11a inputs a signal to the joint quick accelerating/decelerating control means 18. Upon input of the signal from the collision detecting sensor 11a into the joint quick accelerating/decelerating control means 18, the joint quick accelerating/decelerating control means 18 changes the voltage command value of the D/A board 24a from 0 V to 5 V to bring the high-speed ON-OFF valve 9b into an open state, and the open state of the high-speed ON-OFF valve 9b is maintained during a period of time $t_{on}$ calculated from $t_{on}=K_f F+K_v d\theta/dt$, and thereafter, the voltage command value is changed from 5 V to 0 V to bring the high-speed ON-OFF valve 9b into a closed state. Note that F represents the maximum value of collision force detected by the collision detecting sensor 11a, dθ/dt represents a joint angular velocity (time-differential value of the joint angle θ), and $K_f$ and $K_v$ are constant gains that are values obtained through experiments. Thus, the joint quick accelerating/decelerating control means 18 is designed to determine the length of the period of time during which the open state of the proximate fluid pressure high-speed control means 9a and 9b is continued by using the above equation, based upon the magnitude of the force applied to the compressible fluid pressure actuator driving mechanism from the outside or the level of the operation speed (for example, the joint angular velocity) of the compressible fluid pressure actuator driving mechanism, and to control operation of the proximate fluid pressure high-speed control means 9a and 9b. That is, for example, the joint quick accelerating/decelerating control means 18 controls operations of the proximate fluid pressure high-speed control means 9a and 9b so that, after the open states of the proximate fluid pressure high-speed control means 9a and 9b have been continued for a predetermined period of time, they are brought into the closed state to close the passage; thus, pressure-applying or reducing control to each of the pneumatic artificial muscles 6a and 6b can be carried out depending on time periods.

Moreover, the joint quick accelerating/decelerating control means 18 stops updating the target value of the joint angle in the joint control means 17 simultaneously as the joint quick accelerating/decelerating control means 18 brings the high-speed ON-OFF valve 9b into the open state.

Note that the updating of the target value of the joint angle is constantly carried out so as to operate the joint 3. The target value varies from moment to moment, and by following the target value, the motion of the joint 3 is generated. After the collision with the second structural member 2, since the matter might become worse unless the motion of the joint 3 is stopped, the updating of the target value is stopped, and the target value is maintained at a constant value to stop the motion of the joint 3.

In accordance with the above operations, the high-speed ON-OFF valve 9b is brought into an open state immediately after the occurrence of a collision, and the pneumatic artificial muscle 6b is quickly pressurized by high-pressure air having a predetermined pressure (for example, 900 kPa) in the high-pressure tank 8, so that the pneumatic artificial muscle 6b exerts force in the contracting direction, and the generated force is exerted as braking force against the clockwise rotating motion around the rotary joint 3 of the second structural member 2, thereby making it possible to alleviate the impact of the collision.

Since the operation of the high-speed ON-OFF valve 9b is a high-speed operation, and since the high-pressure tank 8 is disposed near the pneumatic artificial muscles 6a and 6b so that the supply passage of high-pressure air from the high-pressure tank 8 is short, the rise of the internal pressure of the pneumatic artificial muscle 6b is quick as shown in FIG. 9, with the result that the braking effect of the air-pressure control system by the high-speed ON-OFF valve 9b is generated prior to the braking effect of the air-pressure control system by the flow-rate controlling electromagnetic valve 23, thereby improving the impact alleviating effect. Note that in FIG. 9, a graph (a) shows a state in which the high-pressure tank 8 applies a high pressure (for example, 900 kPa) exceeding an applicable limit pressure thereto by using the high-speed ON-OFF valve 9b, a graph (b) shows a state in which the high-pressure tank 8 applies the applicable limit pressure (for example, 600 kPa) thereto by using the high-speed ON-OFF valve 9b, and a graph (c) shows a state in which the flow-rate controlling electromagnetic valve is used.

Moreover, since the opening/closing time is controlled based upon the period of time $t_{on}$ calculated from $t_{on}=K_f F + K_v d\theta/dt$, the braking time is set in proportion to the impact force F and the joint angular velocity $d\theta/dt$, so that, when the impact force F is large, or when the joint angular velocity $d\theta/dt$ of the joint 3 is large, the period of time $t_{on}$ becomes longer, that is, the braking time becomes longer, thereby providing the braking effect more reliably. Furthermore, after the time $t_{on}$ passes, the high-speed ON-OFF valve 9b is brought into the closed state, and the braking state is continuously maintained, and after the time $t_p$ passes, the process returns to the normal control by the flow-rate controlling electromagnetic valve 23 as shown in FIG. 9; therefore, the motion of the joint 3 can be stopped reliably without making the internal pressure of the pneumatic artificial muscle 6b too high to cause a reverse rotation of the joint 3.

Moreover, the installation of the high-pressure tank 8 makes it possible to obtain a sufficient flow rate in comparison with the structure without the high-pressure tank 8 in which only pressure supplied from the air-pressure supply system is used, and consequently to obtain a sufficient braking effect. Furthermore, by using a fluid having a high pressure, such as 900 kPa, exceeding the applicable limit pressures of the pneumatic artificial muscles 6a and 6b in the high-pressure tank 8, the start-up speed of the rise of the air pressure becomes faster, as shown in the graph (a) of FIG. 9, so that the pressure-applying speeds of the pneumatic artificial muscles 6a and 6b can be increased, and a higher speed braking operation is achieved. What is more, the use of the fluid having a pressure exceeding the applicable limit pressure of the pneumatic artificial muscles 6a and 6b is limited to only the controlled fine period of time $t_{on}$; therefore, by appropriately setting the length of the fine period of time $t_{on}$, it is possible to prevent the applicable limit pressures of the pneumatic artificial muscles 6a and 6b from being exceeded, and consequently to prevent damage and the like in the pneumatic artificial muscles 6a and 6b.

As described above, in accordance with the first embodiment of the present invention, by installing the high-pressure tank 8 and the high-speed ON-OFF valves 9a and 9b, it becomes possible to carry out a high-speed pressure-applying operation to the pneumatic artificial muscles 6a and 6b, and consequently to achieve a high-speed response, such as quick braking or the like upon collision, so that the safety of the mechanism can be improved. In other words, the high-speed ON-OFF valves 9a and 9b are installed closely in the vicinity of the pneumatic artificial muscles 6a and 6b, and by carrying out a pressure-applying or pressure-reducing control operation on the pneumatic artificial muscles 6a and 6b more quickly than the fluid pressure control operation by the flow-rate controlling electromagnetic valve 23 that controls the motion of the joint 3, it becomes possible to control the pneumatic artificial muscles 6a and 6b so as to carry out quick acceleration or quick deceleration.

In the first embodiment, the description has been given by illustrating a collision on the collision detecting sensor-11a-side; however, even in the case of a collision on the collision detecting sensor-11b-side, by carrying out reversed operations, that is, by operating the high-speed ON-OFF valve 9a with the pneumatic artificial muscle 6a being pressure-applied, the braking operation therefore is possible.

Figure 10A:
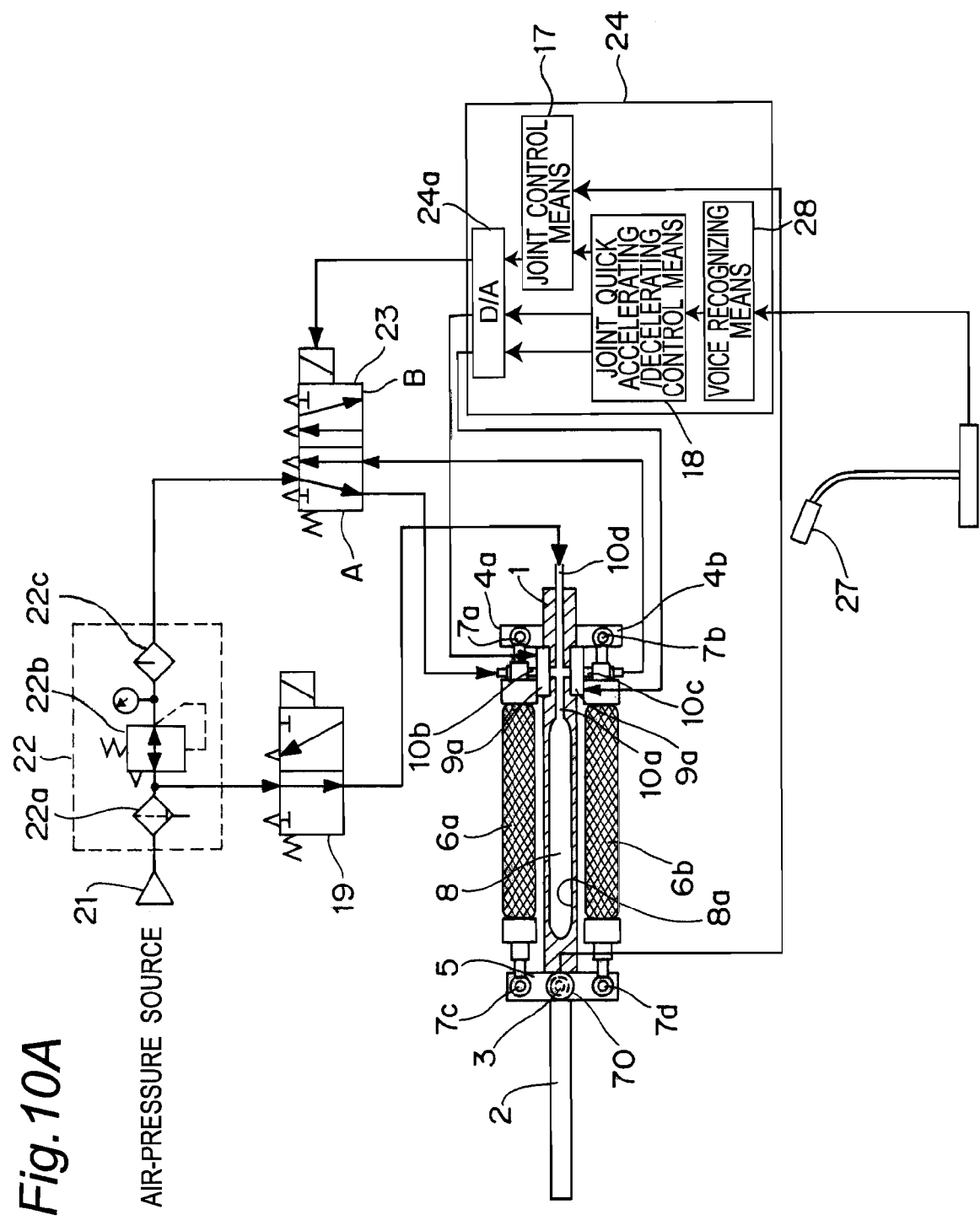
FIG. 10A is a view that shows another structure of the compressible fluid pressure actuator driving mechanism in accordance with the first embodiment of the present invention.

Moreover, in the first embodiment, the collision detecting sensors 11a and 11b are provided, and after detection of a collision by the collision detecting sensors 11a and 11b, the proximate fluid pressure high-speed control means is operated so as to carry out a braking operation. However, the collision detecting sensors are not necessarily required, and for example, as shown in FIG. 10A, a voice input means 27 for inputting a voice command and a voice recognizing means 28 for interpreting the command inputted from the voice input means 27 may be provided. In this structure, when, upon input of human voice such as "stop" from the voice input means 27, the voice such as "stop" is recognized by the voice recognizing means 28 as an operation command to execute a quick stop, based upon the recognized command (operation command), the quick stop is carried out by operating the proximate fluid pressure high-speed control means; thus, in this case also, a high-speed braking effect is achieved.

Figure 10B:
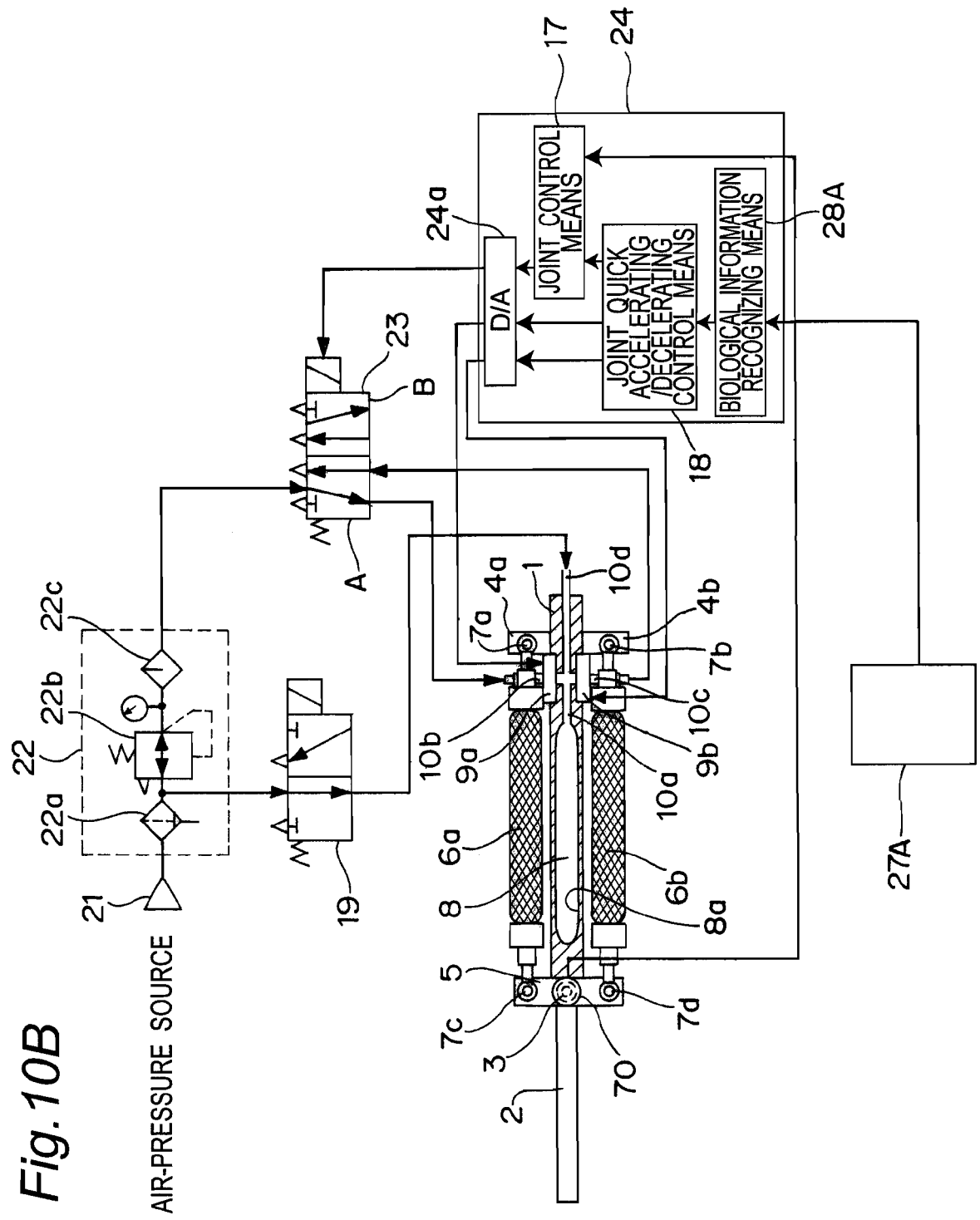
FIG. 10B is a view that shows still another structure of the compressible fluid pressure actuator driving mechanism in accordance with the first embodiment of the present invention.

Moreover, the present invention is not limited to the voice input means 27 for inputting a voice command, the voice recognizing means 28 for interpreting the command, and the like, and another structure is proposed in which, as shown in FIG. 10B, a biological information detecting means 27A for detecting biological information such as a myoelectric potential or a brain wave other than voice is provided, and upon recognition by a biological information recognizing means 28A that the biological information detected by the biological information detecting means 27A is an operation command, based upon the recognized operation command, the quick stop is carried out by operating the proximate fluid pressure high-speed control means; thus, in this case also, a high-speed braking effect is achieved.

Furthermore, the first embodiment is not limited to the braking operation, and the first embodiment may be applied to a case in which a quick accelerating operation is required although high precision is not required, such as an emergent avoiding operation from an obstacle, a hitting operation, or the like.

SECOND EMBODIMENT

Figure 11:
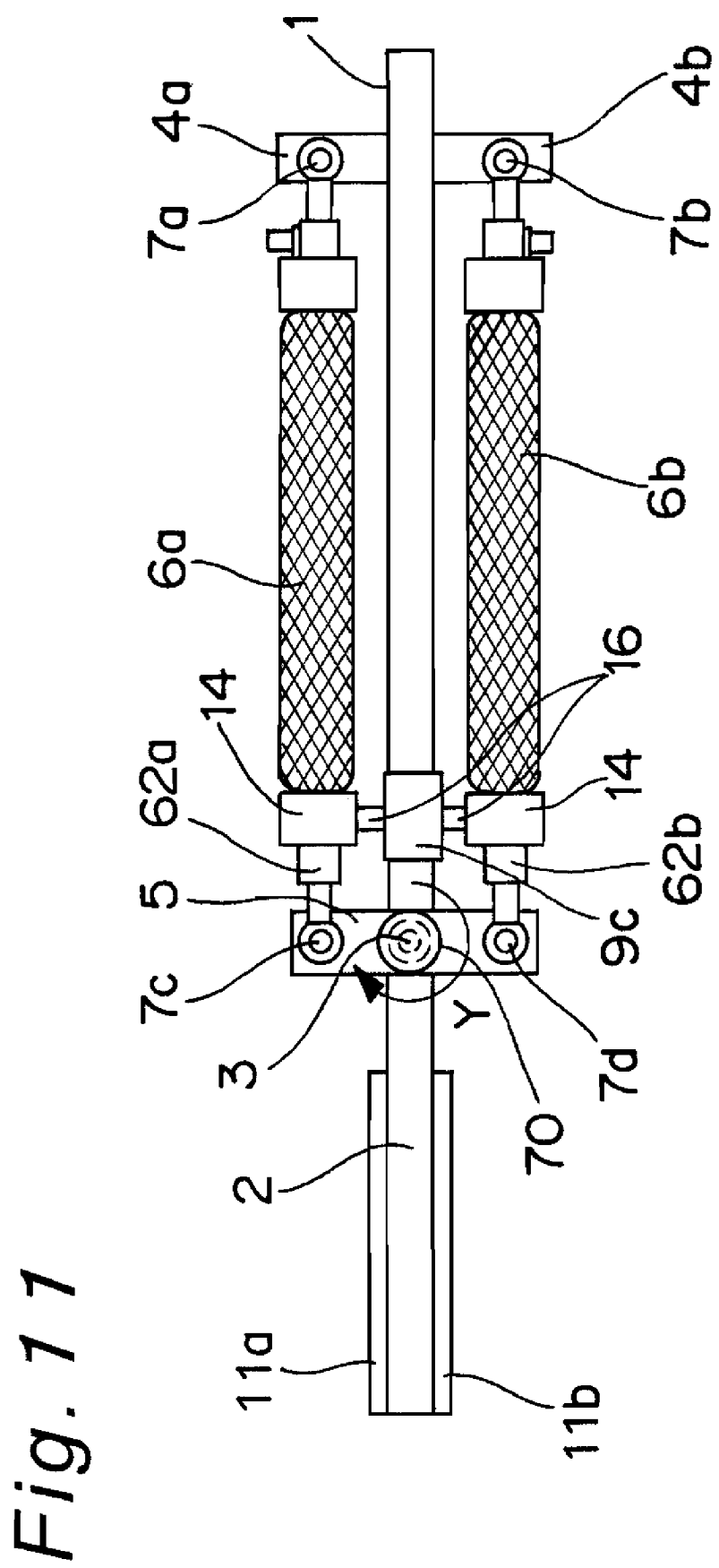
FIG. 11 is a view that shows a structure of a compressible fluid pressure actuator driving mechanism in accordance with a second embodiment of the present invention.

FIG. 11 is a view that shows a structure of a compressible fluid pressure actuator driving mechanism in accordance with a second embodiment of the present invention. The compressible fluid pressure actuator driving mechanism of FIG. 11 differs from that of the first embodiment in the following structural components, and the other components are the same as those of the first embodiment; therefore, the same components as those of the first embodiment are given the same reference numerals as those of the first embodiment, and a detailed description thereof is not made. The second embodiment is an example in which neither the high-pressure tank 8 nor the pressure control valve 19 is provided.

Figure 12:
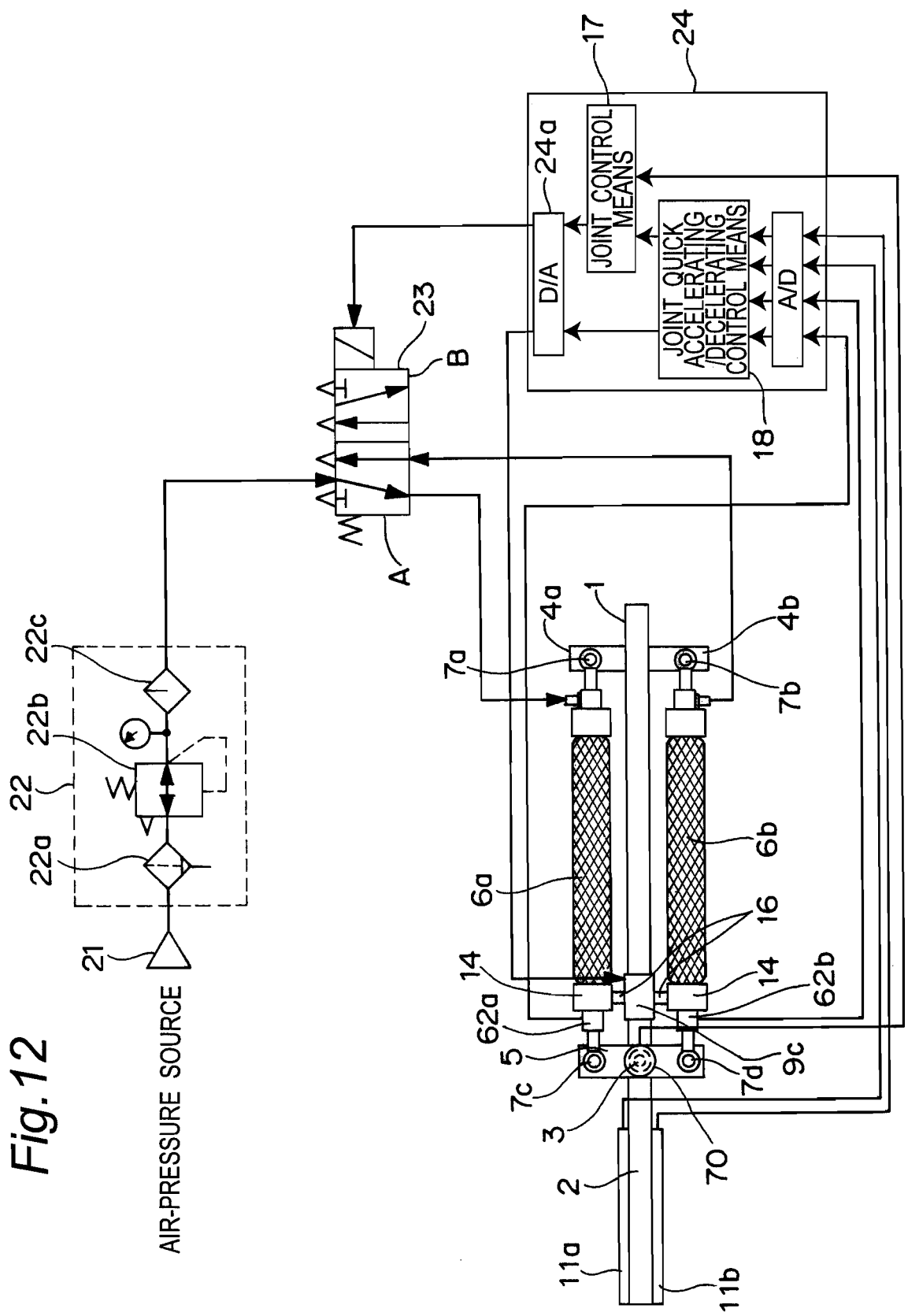
FIG. 12 is a view that shows a structure of an air-pressure supply driving system for driving the compressible fluid pressure actuator driving mechanism of the second embodiment of the present invention.

In FIG. 11, reference numeral 16 denotes a bypass pipe that serves as one example of a bypass means that functions as another example of the proximate fluid pressure high-speed control means, and the bypass pipe 16 directly connects sealing members 14 to each other, which are on the respective ends of the pneumatic artificial muscles 6a and 6b on the actuator driving-force transmission member-5-side. Moreover, reference numeral 9c represents a high-speed ON-OFF valve for use in the bypass pipe, which is open/close-controlled by the joint quick accelerating/decelerating control means 18, and the high-speed ON-OFF valve 9c for the bypass pipe, which is disposed in the middle of the bypass pipe 16, controls the opening and blocking operations of the bypass pipe 16. That is, when the high-speed ON-OFF valve 9c is in the open state, the bypass pipe 16 is opened, so that the internal spaces of the pneumatic artificial muscles 6a and 6b are connected to each other. As shown in FIG. 12, the high-speed ON-OFF valve 9c is connected to the D/A board 24a, and the opening/closing operations of the high-speed ON-OFF valve 9c are controlled by the joint quick accelerating/decelerating control means 18.

Moreover, the sealing members 14 of the pneumatic artificial muscle 6a and the pneumatic artificial muscle 6b are respectively provided with built-in pressure sensors 62a and 62b, so that internal pressures Pa and Pb of the pneumatic artificial muscle 6a and the pneumatic artificial muscle 6b can be measured by the pressure sensors 62a and 62b. Signals indicating the results of measurement of the pressure sensors 62a and 62b are inputted to the joint quick accelerating/decelerating control means 18 through the A/D board 24b and used for opening/closing control on the high-speed ON-OFF valve 9c by the joint quick accelerating/decelerating control means 18.

The following description is given on operations of the compressible fluid pressure actuator driving mechanism having the above-mentioned structure. The operations and the like of the pneumatic artificial muscles 6a and 6b are the same as those of the first embodiment; therefore, with respect to the operations of the common structural components as those of the first embodiment, the description thereof is not made.

As one example, when the pneumatic artificial muscle 6a on the upper side of FIG. 12 contracts, while the other pneumatic artificial muscle 6b on the lower side of FIG. 12 extends, with the result that a clockwise rotating motion is generated around the rotation axis of the rotary joint 3, a collision of a colliding object to the second structural member 2 is detected by the collision detecting sensor 11a, so that the signal from the collision detecting sensor 11a is inputted to the joint quick accelerating/decelerating control means 18. Then, in the case where the joint quick accelerating/decelerating control means 18 determines that the internal pressure $P_a$ of the pneumatic artificial muscle 6a measured by the pressure sensor 62a is higher than the internal pressure $P_b$ of the pneumatic artificial muscle 6b measured by the pressure sensor 62b, the joint quick accelerating/decelerating control means 18 changes the voltage command value of the D/A board 24a from 0 V to 5 V to bring the high-speed ON-OFF valve 9c into an open state, and the open state of the high-speed ON-OFF valve 9c is maintained during a period of time $t_{on}$ calculated from $t_{on}=K_P/(P_a-P_b)$, and thereafter, the high-speed ON-OFF valve 9c is brought into a closed state. However, in the case where the joint quick accelerating/decelerating control means 18 determines that the internal pressures become $P_a \approx P_b$ within a period of time shorter than the period of time $t_{on}$, the joint quick accelerating/decelerating control means 18 brings the high-speed ON-OFF valve 9c into a closed state at that point in time. $K_P$ herein represents a constant gain that is a value obtained through experiments.

Moreover, the joint quick accelerating/decelerating control means 18 stops updating the target value of the joint angle in the joint control means 17 simultaneously as the joint quick accelerating/decelerating control means 18 brings the high-speed ON-OFF valve 9c into the open state, so that the joint control means 17 is also allowed to carry out a braking operation.

Upon determination by the joint quick accelerating/decelerating control means 18 that the internal pressures become $P_a \approx P_b$ within a period of time shorter than the fine period of time $t_{on}$ as described above, the joint quick accelerating/decelerating control means 18 brings the high-speed ON-OFF valve 9c into a closed state at that point in time, because the fact that the internal pressures become $P_a \approx P_b$ indicates that a braking effect caused by the joint control means 17 that has controlled the flow-rate controlling electromagnetic valve 23 starts to function, and because, even if the opened state of the high-speed ON-OFF valve 9c is kept in the opened state for a period longer than this period of time, that is, the fine period of time $t_{on}$, the internal pressure $P_b$ of the pneumatic artificial muscle 6b is no longer raised, and the braking effect thus weakens.

In accordance with the above-described operations, immediately after the occurrence of a collision, the high-speed ON-OFF valve 9c is brought into an open state, and high-pressure air is passed from the pneumatic artificial muscle 6a having relatively high pressure to the pneumatic artificial muscle 6b having relatively low pressure through the bypass pipe 16. As a result, pressure is quickly applied to the pneumatic artificial muscle 6b to allow the pneumatic artificial muscle 6b to exert force in the contracting direction so that the force thus generated functions to apply brake on the motion of the second structural member 2 around the joint 3, thereby alleviating the impact of collision with the colliding object. In other words, by opening and closing the bypass pipe 16, the pressure-applying and pressure-reducing operations can be carried out on each of the pneumatic artificial muscles 6a and 6b more quickly than the fluid pressure control operation by the flow-rate controlling electromagnetic valve 23 for controlling the motion of the joint 3, thereby making it possible to alleviate the impact of collision with the colliding object.

Since the operation of the high-speed ON-OFF valve 9c is a high-speed operation, and since the bypass pipe 16 is disposed near the pneumatic artificial muscles 6a and 6b so that the passage of the bypass pipe 16 is short, the braking effect of the air-pressure control system by the high-speed ON-OFF valve 9c is generated prior to the braking effect of the air-pressure control system by the flow-rate controlling electromagnetic valve 23, thereby improving the impact alleviating effect.

Moreover, since the opening/closing time of the operation of the high-speed ON-OFF valve 9c is controlled based upon the period of time $t_{on}$ calculated from $t_{on}=K_P/(P_a-P_b)$, the period of the open state is made longer when the pressure difference between the pneumatic artificial muscles 6a and 6b is small to function so as to improve the braking effect, while the period of the open state of the operation of the high-speed ON-OFF valve 9c is made shorter when the pressure difference between the pneumatic artificial muscles 6a and 6b is large so as to prevent the reverse rotation of the joint 3 from occurring. Furthermore, after the time $t_{on}$ passes, the high-speed ON-OFF valve 9c is brought into the closed state, with the result that the process returns to the normal control by the flow-rate controlling electromagnetic valve 23; therefore, the motion of the joint 3 can be stopped reliably, without making the internal pressure of the pneumatic artificial muscle 6b too high to cause a reverse rotation of the joint 3.

Furthermore, with respect to the structure of the compressible fluid pressure actuator driving mechanism, neither the air-pressure supply system nor the air-pressure control system used for applying pressure, such as a high-pressure tank provided separately from a normal air-pressure control system, is required, and only one high-speed ON-OFF valve 9c is required so that a high-speed response is obtained with a simple structure.

There is the highest possibility of occurrence of a collision of a colliding object against the second structural member 2 on the collision detecting sensor-11a-side to cause an issue, when the joint 3 is rotating clockwise as indicated by an arrow Y in FIG. 11, and in this case, since the clockwise rotation of the joint 3 is generated, the internal pressure of the pneumatic artificial muscle 6a is often higher than the internal pressure of the pneumatic artificial muscle 6b (the pressure relationship is reversed at the occurrence of a collision on the collision detecting sensor-11b-side). Therefore, in many cases, the braking operation by the use of the bypass pipe 16 achieves sufficient effects.

As described above, in the second embodiment, by disposing the bypass pipe 16 and the high-speed ON-OFF valve 9c, a high-speed pressure-application to the pneumatic artificial muscles 6a and 6b is achieved by using a simple structure, and it is possible to achieve a high-speed response, such as quick braking or the like upon collision with a colliding object, so that the safety of the driving mechanism can be improved.

Note that the above second embodiment has explained a structure in which the period of the opened time of the high-speed ON-OFF valve 9c is given by $t_{on}=K_p/(P_a-P_b)$; however, the present invention is not limited thereto, and the equation $t_{on}=K_pF+K_vd\theta/dt$ may be used in the same manner as in the first embodiment, which gives the same effects.

THIRD EMBODIMENT

Figure 13:
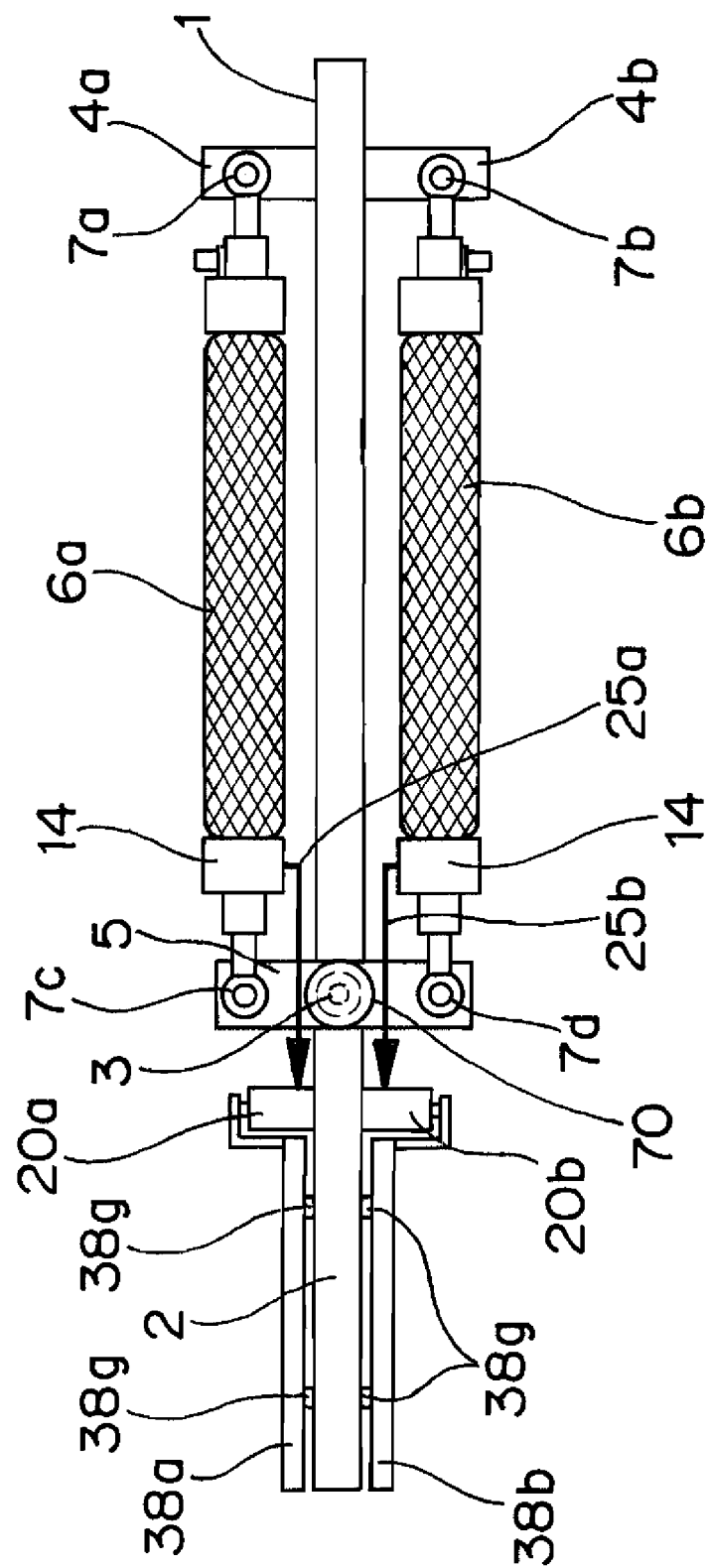
FIG. 13 is a view that shows a structure of a compressible fluid pressure actuator driving mechanism in accordance with a third embodiment of the present invention.

FIG. 13 is a view that shows a structure of a compressible fluid pressure actuator driving mechanism in accordance with a third embodiment of the present invention. The compressible fluid pressure actuator driving mechanism of FIG. 13 differs from that of the first embodiment in the following components, and the other components are the same as those of the first embodiment; therefore, the same structural components as those of the first embodiment are given the same reference numerals as those of the first embodiment, and a detailed description thereof is not made.

In FIG. 13, reference numerals 20a and 20b denote relief valves that are another example of the proximate fluid pressure high-speed control means, and both of the relief valves 20a and 20b are disposed near the joint 3 of the second structural member 2 and mechanistically connected to collision detecting sensor plates 38a and 38b that are formed of substantially L-shaped plate members. That is, the ends of the collision detecting sensor plates 38a and 38b on the side close to the joint 3 are coupled to the relief valves 20a and 20b. Moreover, reference numerals 25a and 25b denote air-pressure releasing pipes, and the air-pressure releasing pipes 25a connects the sealing member 14 at the end of the pneumatic artificial muscle 6a on the actuator driving-force transmission member-5-side to the relief valve 20a. The other air-pressure releasing pipe 25b connects the sealing member 14 at the end of the pneumatic artificial muscle 6b on the actuator driving-force transmission member-5-side to the relief valve 20b. The relief valves 20a and 20b are designed so that, when force to be applied to the compressible fluid pressure actuator driving mechanism from the outside exceeds a predetermined value, each of them carries out a pressure-reducing control operation.

Figure 14A:
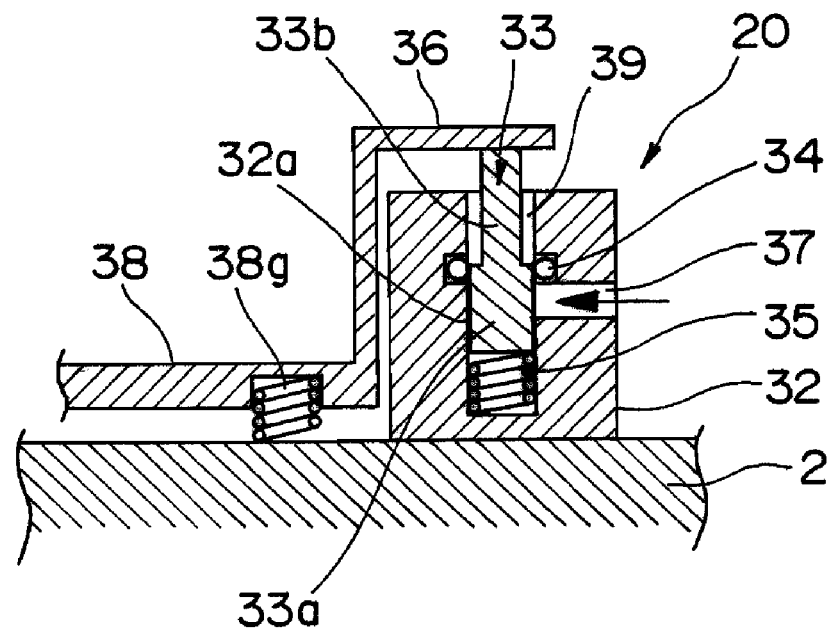
FIG. 14A is a view that shows a structure and operations of a relief valve of the compressible fluid pressure actuator driving mechanism in accordance with the third embodiment of the present invention.
Figure 14B:
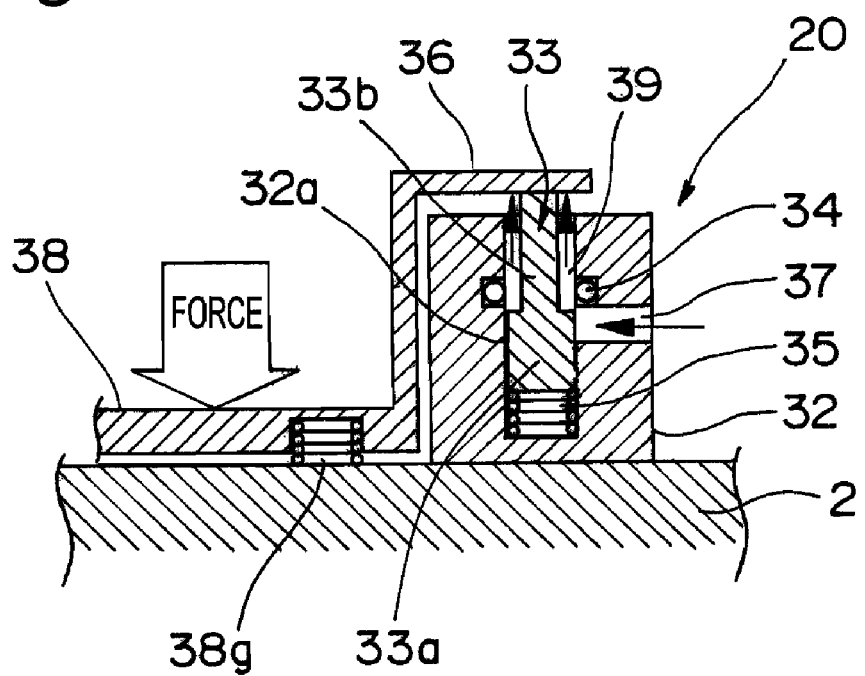
FIG. 14B is a view that shows the structure and operations of the relief valve of the compressible fluid pressure actuator driving mechanism in accordance with the third embodiment of the present invention.

FIGS. 14A and 14B show the structure of one relief valve 20 of the relief valves 20a and 20b in detail. The relief valve 20 is configured by a housing 32 having a U-shape in its longitudinal cross section, a spool 33 that has a large-diameter base end portion 33a and a small-diameter tip portion 33b integrally coupled to each other and is allowed to advance and retreat in the axis direction inside a concave section 32a of the housing 32, an O-ring 34 that seals the concave section 32a and the large-diameter base end portion 33a of the spool 33, and a spool spring 35 that is provided in a compressed state between the bottom face of the concave section 32a and the inner end face of the large-diameter base end portion 33a of the spool 33. One collision detecting sensor plate 38 of the collision detecting sensor plates 38a and 38b and the spool 33 are mechanistically coupled to each other, with the outer end face of the small-diameter tip portion 33b of the spool 33 being secured to a lever 36 at the end of the collision detecting sensor plate 38 having a substantially L-shape. Moreover, an air introducing port 37 provided on the housing 32 in a direction orthogonal to the axial direction of the concave section 32a so as to communicate with the concave section 32a on the bottom side from the position where the O-ring 34 is disposed, is connected to the pneumatic artificial muscles 6a and 6b through the air-pressure releasing pipes 25a and 25b. Note that the gap between the small-diameter tip portion 33b of the spool 33 and the concave section 32a forms an air discharging port 39. Moreover, a plurality of springs 38g are provided in a compressed state between the collision detecting sensor plate 38 and the second structural member 2, so that, upon collision of a colliding object with the collision detecting sensor plate 38, the impact force of the collision can be absorbed by the springs 38g.

Referring to FIGS. 14A and 14B, the following description is given on operations of the compressible fluid pressure actuator driving mechanism having the above structure. The operations and the like of the pneumatic artificial muscles 6a and 6b are the same as those of the first embodiment; therefore, with respect to the operations of the common structural components as those of the first embodiment, the description thereof is not made.

During normal operation, the spool 33 is pressed upward as shown in FIG. 14A by pressing force of the spool spring 35 in each of the relief valves 20a and 20b to be brought into the state shown in FIG. 14A, so that the large-diameter base end portion 33a of the spool 33 and the O-ring 34 are made in tight contact with each other, thereby sealing high-pressure air to be used for applying pressure to the pneumatic artificial muscle 6a, which is directed to the air introducing port 37.

Upon occurrence of a collision of a colliding object with either one of the collision detecting sensor plates 38a and 38b, for example, the collision detecting sensor plate 38a, a force caused by the collision of the colliding object is transmitted to the spool 33 of the relief valve 20a mechanistically connected thereto by the lever 36, and the spool 33 is pressed down by the concave section 32a of the housing 32 as shown in FIG. 14A by the force transmitted to the spool 33. When the force caused by the collision (in other words, force applied to the compressible fluid pressure actuator driving mechanism from the outside) exceeds a certain value (constant value), the spool is brought into a state shown in FIG. 14B, with the result that a step difference portion between the large-diameter base end portion 33a and the small-diameter tip portion 33b of the spool 33 is located on the lower side from the position of the O-ring 34 in FIG. 14B; thus, the passage from the air introducing port 37 to the air discharging port 39 is opened, and the high-pressure air introduced to the air introducing port 37 is released into the atmosphere. Then, the high-pressure air inside the pneumatic artificial muscle 6a is caused to flow toward the air discharging port 39 through the air-pressure releasing pipe 25a to cause pressure reduction in the internal pressure of the pneumatic artificial muscle 6a, so that the contracting force of the pneumatic artificial muscle 6a is reduced. Consequently, the torque that tries to rotate the rotary joint 3 is reduced, and braking is applied to the rotating motion of the rotary joint 3.

In the same manner, upon occurrence of a collision of a colliding object with the collision detecting sensor plate 38b, the relief valve 20b is operated, so that braking is applied to the reversed rotating motion of the rotary joint 3. That is, in the third embodiment, the pneumatic artificial muscle 6a and the relief valve 20a, disposed on the same side relative to the center axis of each of the first structural member 1 and the second structural member 2 serving as the symmetrical axis, are moved in conjunction with each other, with the pneumatic artificial muscle 6b and the relief valve 20b being moved in conjunction with each other, so that a braking effect is exerted on the rotating motion of the rotary joint 3.

As described above, in the third embodiment, by providing the relief valve 20 and the air-pressure releasing pipe 25, braking on the rotating motion of the rotary joint 3 can be achieved by using a simple structure that is mechanistically operable, without installing such a system as to be controlled by a controlling program, so that it is possible to prevent excessive force from being applied to a colliding object upon occurrence of a collision.

FOURTH EMBODIMENT

Figure 15:
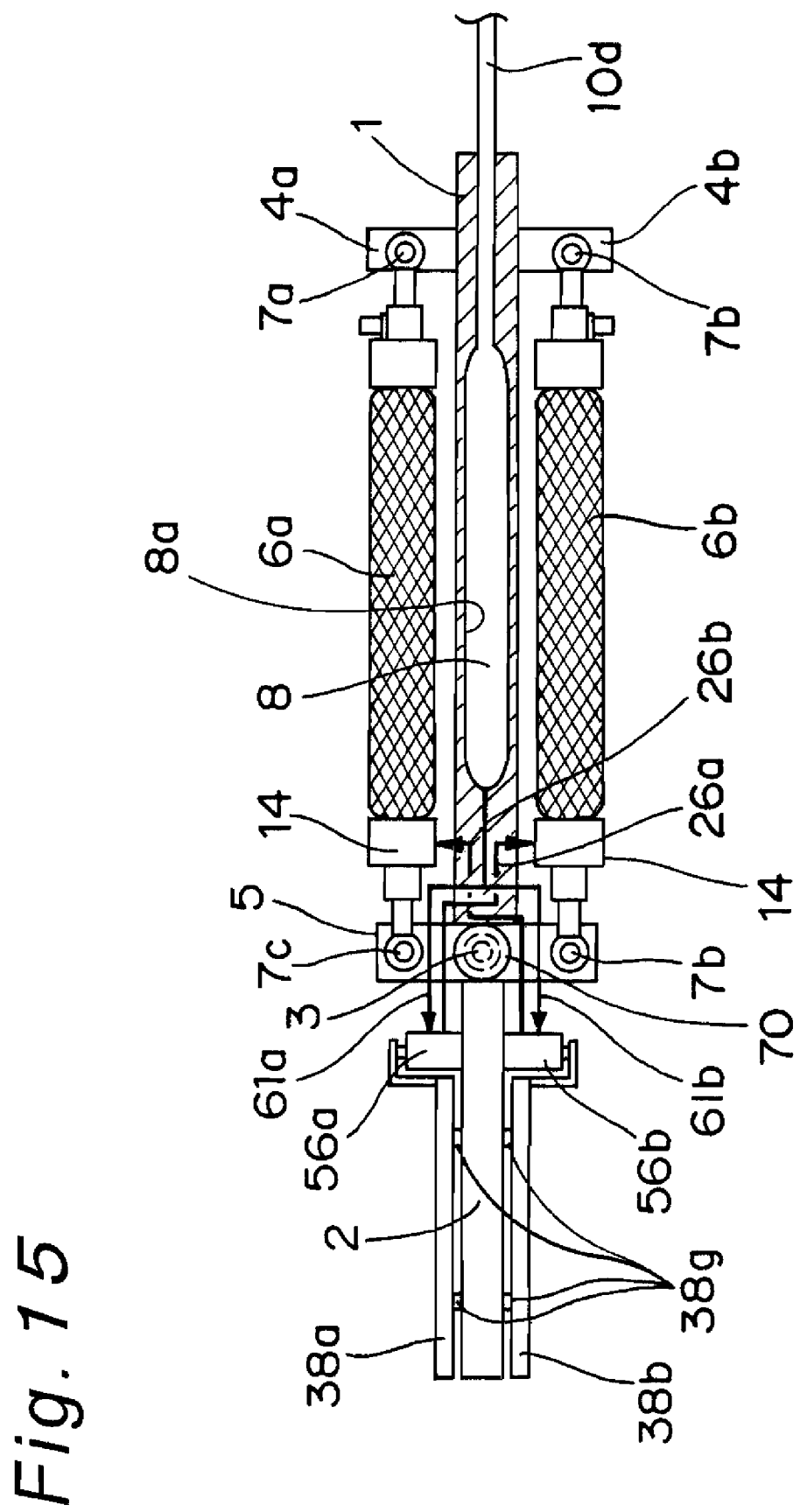
FIG. 15 is a view that shows a structure of a compressible fluid pressure actuator driving mechanism in accordance with a fourth embodiment of the present invention.

FIG. 15 is a view that shows a structure of a compressible fluid pressure actuator driving mechanism in accordance with a fourth embodiment of the present invention. The compressible fluid pressure actuator driving mechanism of FIG. 15 differs from that of the first embodiment or the third embodiment in the following structural components, and the other components are the same as those of the first embodiment or the third embodiment; therefore, the same structural components as those of the first embodiment or the third embodiment are given the same reference numerals as those of the first embodiment or the third embodiment, and a detailed description thereof is not made.

In FIG. 15, reference numeral 8 represents a high-pressure tank in which high-pressure air is stored by an air-pressure supply system in the same manner as in the first embodiment. Reference numerals 61a and 61b represent tank pipes, and the tank pipes 61a connects the high-pressure tank 8 to a relief valve 56a, while the other tank pipe 61b connects the high-pressure tank 8 to a relief valve 56b, respectively. In the same manner as in the aforementioned relief valves 20a and 20b, both of the relief valves 61a and 61b are disposed near the joint 3 of the second structural member 2 and mechanistically connected to collision detecting sensor plates 38a and 38b respectively, which are formed of substantially L-shaped plate members. That is, the ends of the collision detecting sensor plates 38a and 38b on the side near the joint 3 are coupled to relief valves 61a and 61b. Further, reference numerals 26a and 26b represent pressure-applying pipes, and the pressure-applying pipes 26b connects the relief valve 56a to the sealing member 14 at the end of the pneumatic artificial muscle 6b on the actuator driving-force transmission member-5-side, while the other pressure-applying pipe 26a connects the relief valve 56b to the sealing member 14 at the end of the pneumatic artificial muscle 6a on the actuator driving-force transmission member-5-side.

Figure 16A:
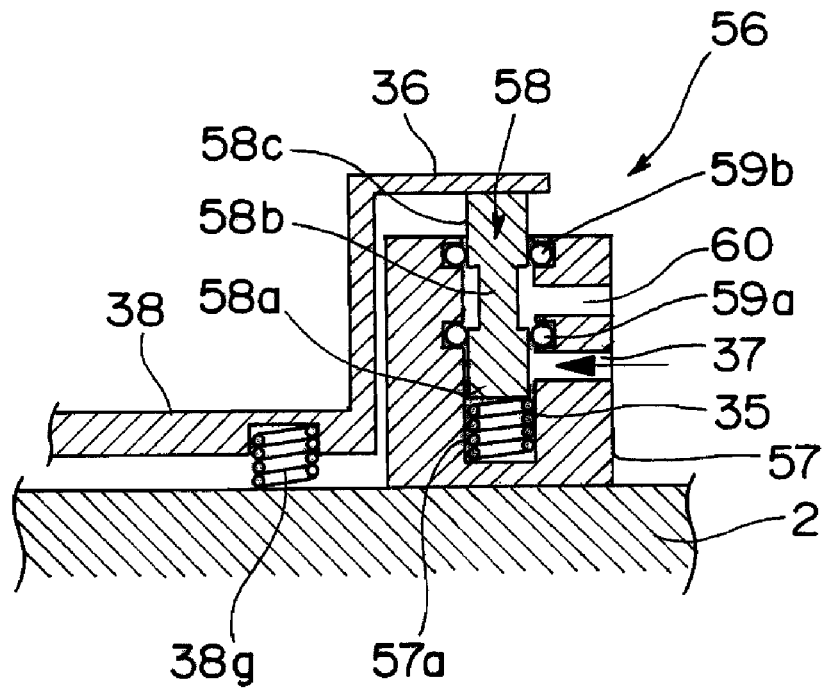
FIG. 16A is a view that shows a structure and operations of a relief valve of the compressible fluid pressure actuator driving mechanism in accordance with the fourth embodiment of the present invention.
Figure 16B:
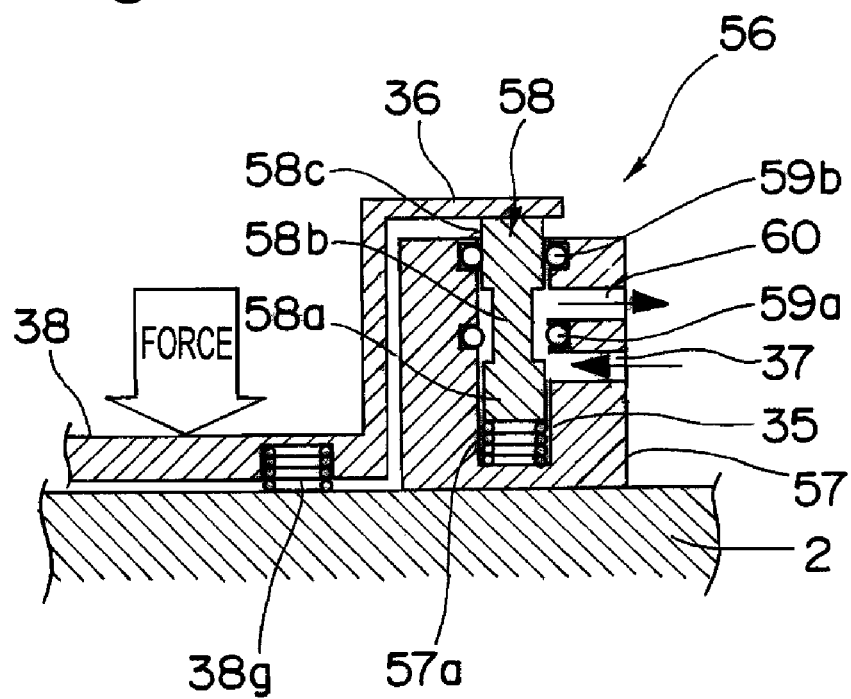
FIG. 16B is a view that shows the structure and operations of the relief valve of the compressible fluid pressure actuator driving mechanism in accordance with the fourth embodiment of the present invention.

FIGS. 16A and 16B show the structure of one relief valve 56 of the relief valves 56a and 56b in detail. The relief valve 56 is configured by a housing 57 having a U-shape in its longitudinal cross section, a spool 58 that has a large-diameter base end portion 58a, a small-diameter intermediate portion 58b, and a large-diameter tip portion 58c integrally coupled to one another and is allowed to advance and retreat in the axial direction inside a concave section 57a of the housing 57, O-rings 59a and 59b that seal the concave section 57a and the large-diameter base end portion 58a as well as the large-diameter tip portion 58c of the spool 58 respectively, and a spool spring 35 that is provided in a compressed state between the bottom face of the concave section 57a and the inner end face of the large-diameter base end portion 58a of the spool 58. One collision detecting sensor plate 38 of the collision detecting sensor plates 38a and 38b and the spool 58 are mechanistically coupled to each other with the outer end face of the large-diameter tip portion 58c of the spool 58 being secured to a lever 36 at the end of the collision detecting sensor plate 38 having a substantially L-shape. Moreover, an air introducing port 37 is formed on the housing 57 in a direction orthogonal to the axial direction of the concave section 57a so as to communicate with the concave section 57a on the bottom side from the position where the O-ring 59a is disposed. In addition, a return port 60 is disposed on the housing 57 in a direction orthogonal to the axial direction of the concave section 57a, between the position disposed with the O-ring 59a and the position disposed with the O-ring 59b; thus, the air introducing port 37 is connected to the high-pressure tank 8 through the tank pipes 61a and 61b, so that high-pressure air from the high-pressure tank 8 is introduced. Moreover, the return port 60 is connected to either one of the pneumatic artificial muscles 6b and 6a that is not connected to the air introducing port 37 by the pressure-applying pipe 26a or 26b.

Referring to FIGS. 16A and 16B, the following description is given on operations of the compressible fluid pressure actuator driving mechanism having the above structure. The operations and the like of the pneumatic artificial muscles 6a and 6b are the same as those of the first embodiment; therefore, with respect to the operations of the common structural components as those of the first embodiment, the description thereof is not made.

During normal operation, the spool 58 is pressed upward as shown in FIG. 16A by pressing force of the spool spring 35 in each of the relief valves 56a and 56b to be brought into the state shown in FIG. 16A, so that the large-diameter base end portion 58a of the spool 58 and the O-ring 59a are made in tight contact with each other, thereby sealing high-pressure air that has been directed to the air introducing port 37 from the high-pressure tank 8 through the tank pipes 61a and 61b.

Upon occurrence of a collision of a colliding object with either one of the collision detecting sensor plates 38a and 38b, for example, the collision detecting sensor plate 38a, a force caused by the collision of the colliding object is transmitted to the spool 58 of the relief valve 56a mechanistically connected thereto by the lever 36, and the spool 58 is pressed down by the concave section 57a of the housing 57 as shown in FIG. 16A by the force transmitted to the spool 58. When the force caused by the collision (in other words, force applied to the compressible fluid pressure actuator driving mechanism from the outside) exceeds a certain value, the spool is brought into a state shown in FIG. 16B, with the result that a step difference portion between the large-diameter base end portion 58a and the small-diameter intermediate portion 58b of the spool 58 is located on the lower side from the position of the O-ring 59a in FIG. 16B. As a result, the passage from the air introducing port 37 to the return port 60 is opened, the high-pressure air stored in the high-pressure tank 8 is charged into the pneumatic artificial muscle 6b through the tank pipe 61a, the air introducing port 37, the return port 60, and the pressure-applying pipe 26a, and the internal pressure of the pneumatic artificial muscle 6b is increased, so that the contracting force of the pneumatic artificial muscle 6b is increased. Consequently, reverse torque that tries to reduce the rotating motion of the rotary joint 3 is generated so that braking is applied to the rotating motion of the rotary joint 3.

In the same manner, upon occurrence of a collision of a colliding object with the collision detecting sensor plate 38b, the relief valve 56b is operated, so that braking is applied to the reverse rotating motion of the rotary joint 3. That is, in the third embodiment, the pneumatic artificial muscle 6a and the relief valve 56b, disposed on the opposite side relative to the center axis of each of the first structural member 1 and the second structural member 2 serving as the symmetrical axis, are moved in conjunction with each other, with the pneumatic artificial muscle 6b and the relief valve 56a being moved in conjunction with each other, so that a braking effect is exerted on the rotating motion of the rotary joint 3.

As described above, in the fourth embodiment, by providing the relief valve 56, the tank pipe 61, and the pressure-applying pipe 26, braking against the rotating motion of the rotary joint 3 can be achieved by using a simple structure that is mechanistically operable, without providing such a system as to be controlled by a controlling program, so that it is possible to prevent excessive force from being applied to a colliding object upon occurrence of a collision.

FIFTH EMBODIMENT

Figure 17:
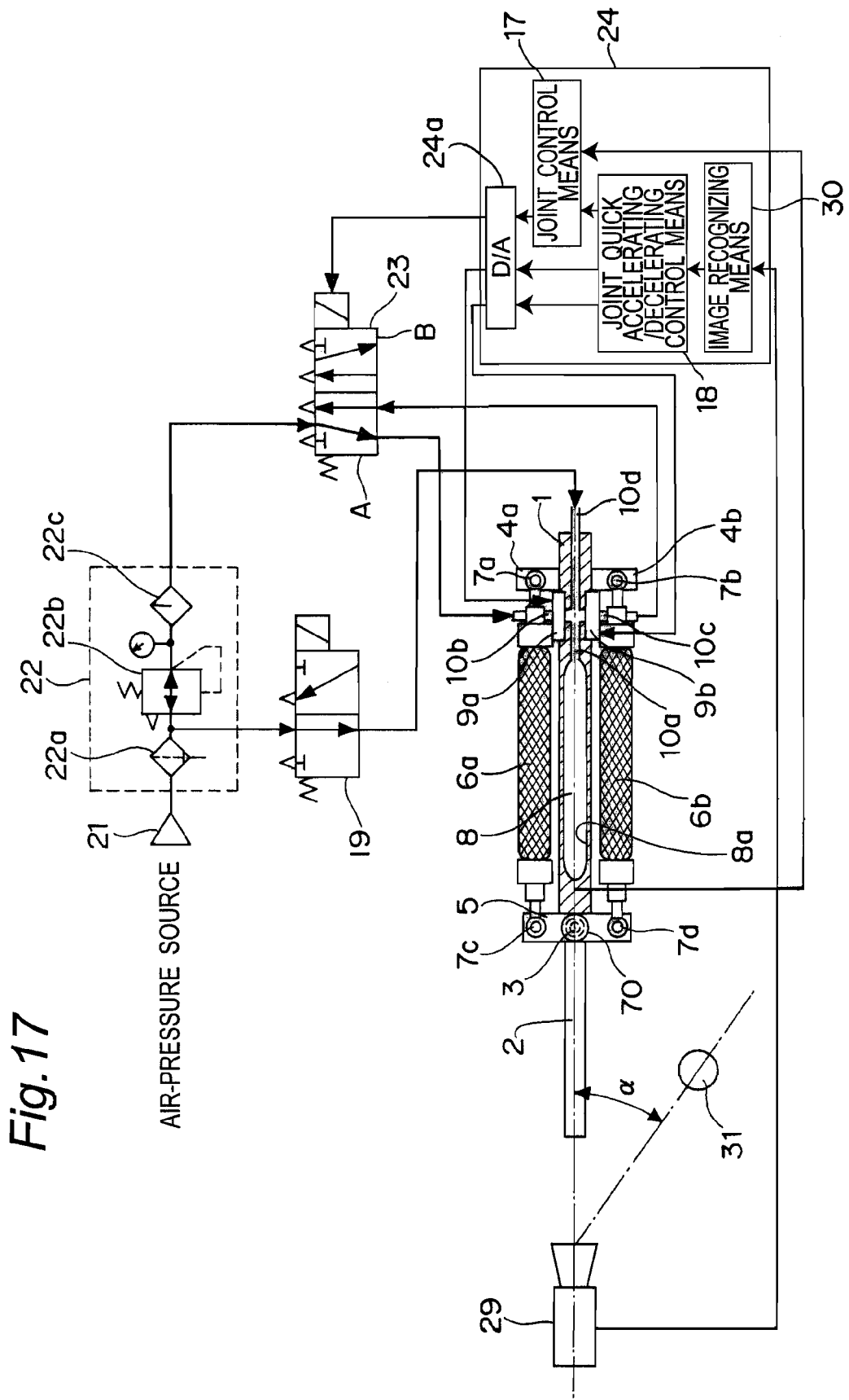
FIG. 17 is a view that shows a structure of a compressible fluid pressure actuator driving mechanism in accordance with a fifth embodiment of the present invention.

FIG. 17 is a view that shows a structure of a compressible fluid pressure actuator driving mechanism in accordance with a fifth embodiment of the present invention. The compressible fluid pressure actuator driving mechanism of FIG. 17 differs from that of the first embodiment in the following structural components, and the other components are the same as those of the first embodiment; therefore, the same structural components as those of the first embodiment are given the same reference numerals as those of the first embodiment, and a detailed description thereof is not made.

The fifth embodiment is an embodiment relating to a structure in which an object 31 that is falling down at a high speed in a direction from the front side of the paper surface of FIG. 17 to the back side thereof is captured by a second structural member 2 by moving the rotary joint 3.

In FIG. 17, reference numeral 29 represents an image pickup means, such as a CCD camera, that is disposed in such a manner that the center axis of a picked-up image area of the image pickup means 29 is made coincident with the center axis of the first structural member 1.

Reference numeral 30 represents an image recognizing means to which image data captured by the image pickup means 29 is inputted, and the position of the object 31 is recognized by the image recognizing means 30 based upon the image data, so that an angle α made by the direction of the center axis (optical axis) of the image pickup means 29 and a direction in which the object 31 is located is calculated by the image recognizing means 30, and a signal indicating the information of the calculation result is then outputted to the joint quick accelerating/decelerating control means 18. Based upon the inputted information of the calculation result, the joint quick accelerating/decelerating control means 18 carries out a quick accelerating or decelerating control on the motion of the rotary joint 3, so that the object 31 moving at a high speed and falling down can be captured by the second structural member 2. As a specific example of the capturing device of the object 31, in the case where the object 31 is captured by the second structural member 2, an object-receiving part having a shape like a glove capable of receiving the object 31 may be attached to the tip of the second structural member 2.

Referring to FIG. 18, the following description is given on operations of the compressible fluid pressure actuator driving mechanism having the above structure. The operations and the like of the pneumatic artificial muscles 6a and 6b are the same as those of the first embodiment; therefore, with respect to the operations of the common structural components as those of the first embodiment, the description thereof is not made.

Upon receipt of information of the angle α from the image recognizing means 30 at time $t=t_1$, the joint quick accelerating/decelerating control means 18 carries out controlling processes such that the high-speed ON-OFF valve 9b is maintained in an open state during a period of time $t_{on}$ calculated from $t_{on}=K_\alpha \alpha$ (time from $t_1$ to $t_2$ in FIG. 18) and thereafter, the high-speed ON-OFF valve 9b is brought into a closed state at time $t=t_2$. Note that $K_\alpha$ represents a constant gain that is a value obtained through experiments.

Upon receipt of information of the angle α from the image recognizing means 30 through the joint quick accelerating/decelerating control means 18 at time $t=t_1$, the joint control means 17 gives a voltage command value V, calculated as $V=K_\alpha(\alpha-\theta)$, to the flow-rate controlling electromagnetic valve 23 to carry out servo control of the joint angle θ. Note that $K_\alpha$ represents a constant gain.

In accordance with the above-described arrangement, up to the time $t_2$, the second structural member 2 quickly approaches the object 31 by the effect of high-speed pressure application to the pneumatic artificial muscle 6b executed by the high-pressure tank 8 and the high-speed ON-OFF valve 9b. After the time $t_2$, since the operation is switched to an accurate operation by the servo control carried out by the flow-rate controlling electromagnetic valve 23 under the control of the joint control means 17, the joint angle θ is converged into the angle α, so that the object 31 is reliably captured.

As described above, in the fifth embodiment, by providing the high-pressure tank 8 and the high-speed ON-OFF valves 9a and 9b, high-speed pressure application to the pneumatic artificial muscles 6a and 6b can be carried out, and a high-speed response is obtained, so that it becomes possible to reliably capture an object moving at a high speed.

By properly combining the arbitrary embodiments of the aforementioned various embodiments, the effects possessed by the embodiments can be produced.

INDUSTRIAL APPLICABILITY

The compressible fluid pressure actuator driving mechanism and its control apparatus of the present invention are effectively used as a joint driving mechanism for a robot arm with multiple joints and its control apparatus. Moreover, the present invention is not limited to the robot arm, and they are applicable to a joint driving mechanism or the like used for a rotation mechanism in a production facility or the like, a driving mechanism for a mechanical apparatus, and a control apparatus thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A compressible fluid pressure actuator driving mechanism with which a joint motion is driven by antagonistic driving of a plurality of compressible fluid pressure actuators, comprising:
 a main-fluid pressure control means for controlling the joint motion by carrying out a pressure-applying or pressure-reducing control operation on the compressible fluid pressure actuators to control respective fluid pressures of the compressible fluid pressure actuators; and
 a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion such that the compressible fluid pressure actuators are quickly accelerated or quickly decelerated.

2. The compressible fluid pressure actuator driving mechanism according to claim 1, further comprising:
 a fluid supply means for supplying a fluid to each of the compressible fluid pressure actuators to apply a pressure to each of the compressible fluid pressure actuators, wherein
 the proximate fluid pressure high-speed control means is capable of quickly applying pressure to each of the compressible fluid pressure actuators by using the fluid supplied by the fluid supply means.

3. The compressible fluid pressure actuator driving mechanism according to claim 2, wherein the fluid supply means has a fluid storing means for storing the fluid to be supplied to each of the compressible fluid pressure actuators from the fluid supply means, the fluid storing means being disposed closely to the compressible fluid pressure actuators.

4. The compressible fluid pressure actuator driving mechanism according to claim 3, wherein a void is provided in a structural member of the compressible fluid pressure actuator driving mechanism such that the fluid storing means stores the fluid in the void.

5. The compressible fluid pressure actuator driving mechanism according to claim 2, wherein the fluid supply means supplies a fluid having pressure exceeding an applicable limit pressure of the compressible fluid pressure actuators.

6. The compressible fluid pressure actuator driving mechanism according to claim 2, wherein the proximate fluid pressure high-speed control means is a relief valve for carrying out the pressure-reducing control operation, when a force applied to the compressible fluid pressure actuator driving mechanism from an outside exceeds a predetermined value.

7. The compressible fluid pressure actuator driving mechanism according to claim 1, wherein the proximate fluid pressure high-speed control means is a bypass means for mutually bypassing the antagonistic compressible fluid pressure actuators, and by opening and closing the bypass means, pressure application or pressure reduction is carried out on each of the compressible fluid pressure actuators more quickly than the fluid pressure control operation of the main-fluid pressure control means for controlling the joint motion.

8. The compressible fluid pressure actuator driving mechanism according to claim 1, wherein the proximate fluid pressure high-speed control means is a relief valve for carrying out the pressure-reducing control operation, when a force applied to the compressible fluid pressure actuator driving mechanism from an outside exceeds a predetermined value.

9. The compressible fluid pressure actuator driving mechanism according to claim 1, further comprising a collision detecting means for detecting a collision, wherein upon detecting a collision by the collision detecting means, the proximate fluid pressure high-speed control means is allowed to carry out the pressure-reducing control operation.

10. The compressible fluid pressure actuator driving mechanism according to claim 1, further comprising a joint quick accelerating/decelerating control means for carrying out pressure-applying or reducing control on the compressible fluid pressure actuators depending on time, by controlling operation of the proximate fluid pressure high-speed control means such that, after an open state is kept by the proximate fluid pressure high-speed control means for a predetermined time, a closed state is attained to close a passage.

11. The compressible fluid pressure actuator driving mechanism according to claim 10, further comprising a joint quick accelerating/decelerating control means for controlling operation of the proximate fluid pressure high-speed control means by determining a length of a period of time during which the proximate fluid pressure high-speed control means is kept in an open state, based upon a level of a force to be applied to the compressible fluid pressure actuator driving mechanism from an outside.

12. The compressible fluid pressure actuator driving mechanism according to claim 10, further comprising a joint quick accelerating/decelerating control means for controlling operation of the proximate fluid pressure high-speed control means by determining a length of a period of time during which the proximate fluid pressure high-speed control means is kept in an open state, based upon a level of an operation speed of the compressible fluid pressure actuator driving mechanism.

13. The compressible fluid pressure actuator driving mechanism according to claim 1, wherein the proximate fluid pressure high-speed control means is a high-speed ON-OFF valve that communicates with the compressible fluid pressure actuators to carry out only opening and closing operations on a passage to execute a pressure-applying or pressure-reducing control operation on the compressible fluid pressure actuators, for carrying out the opening and closing operations more quickly than the fluid pressure control operation of the main-fluid pressure control means.

14. The compressible fluid pressure actuator driving mechanism according to claim 1, further comprising: a biological information detecting means for detecting biological information; and a biological information recognizing means for recognizing the biological information detected by the biological information detecting means, wherein
 when information recognized by the biological information recognizing means corresponds to an operation command, the compressible fluid pressure actuator driving mechanism operates the proximate fluid pressure high-speed control means.

15. An apparatus for controlling a compressible fluid pressure actuator driving mechanism with which a joint motion is driven by antagonistic driving of a plurality of compressible fluid pressure actuators, the compressible fluid pressure actuator driving mechanism comprising: a main-fluid pressure control means for controlling the joint motion by carrying out a pressure-applying or pressure-reducing control operation on the compressible fluid pressure actuators to control respective fluid pressures of the compressible fluid pressure actuators; and a proximate fluid pressure high-speed control means, disposed closely in a vicinity of the compressible fluid pressure actuators, for carrying out a pressure-applying or pressure-reducing control operation on the compressible fluid pressure actuators more quickly than fluid pressure control operation of the main-fluid pressure control means for controlling the joint motion such that the compressible fluid pressure actuators are quickly accelerated or quickly decelerated, the apparatus comprising:

a joint control means for controlling the joint motion by controlling operation of the main-fluid pressure control means based upon information of the joint motion; and a joint quick accelerating/decelerating control means for controlling operation of the proximate fluid pressure high-speed control means such that a quick accelerating or decelerating operation of the joint is controlled.

* * * * *